US009828844B2

(12) United States Patent
Zhou et al.

(10) Patent No.: US 9,828,844 B2
(45) Date of Patent: *Nov. 28, 2017

(54) HYDRAULIC FRACTURING COMPOSITION, METHOD FOR MAKING AND USE OF SAME

(71) Applicants: Jia Zhou, Cypress, TX (US); Qi Qu, Spring, TX (US); Scott G. Nelson, Cypress, TX (US); Hong Sun, Houston, TX (US); Leiming Li, Sugar Land, TX (US)

(72) Inventors: Jia Zhou, Cypress, TX (US); Qi Qu, Spring, TX (US); Scott G. Nelson, Cypress, TX (US); Hong Sun, Houston, TX (US); Leiming Li, Sugar Land, TX (US)

(73) Assignee: BAKER HUGHTES, a GE company, LLC, Houston, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/169,698

(22) Filed: Jan. 31, 2014

(65) Prior Publication Data

US 2014/0332214 A1 Nov. 13, 2014

Related U.S. Application Data

(63) Continuation-in-part of application No. 13/888,457, filed on May 7, 2013.

(51) Int. Cl.
*E21B 43/267* (2006.01)
*C09K 8/68* (2006.01)

(52) U.S. Cl.
CPC ............ *E21B 43/267* (2013.01); *C09K 8/685* (2013.01); *C09K 2208/26* (2013.01)

(58) Field of Classification Search
None
See application file for complete search history.

(56) References Cited

U.S. PATENT DOCUMENTS

| 4,713,203 A | 12/1987 | Andrews |
| 5,171,350 A | 12/1992 | Stainer |

(Continued)

FOREIGN PATENT DOCUMENTS

| EP | 1884549 A1 | 2/2008 |
| JP | 2003154262 A | 5/2003 |

(Continued)

OTHER PUBLICATIONS

"Hydraulic Fracturing," Chesapeake Energy; Fact Sheet, May 2012, p. 1-3.

(Continued)

*Primary Examiner* — Angela M DiTrani
(74) *Attorney, Agent, or Firm* — Cantor Colburn LLP

(57) ABSTRACT

A hydraulic fracturing composition includes: a superabsorbent polymer in an expanded state; a plurality of proppant particles disposed in the superabsorbent polymer; an additive comprising a surfactant, a viscose polymer, or a combination thereof, and a fluid to expand the superabsorbent polymer into the expanded state. A process for disposing a plurality of proppant particles in a fracture comprises: disposing a hydraulic fracturing composition in a downhole environment; forming a fracture; disposing the hydraulic fracturing composition in the fracture; breaking the superabsorbent polymer after forming the fracture; and releasing the plurality of proppant particles from superabsorbent polymer. The process also comprises injecting a proppant-free fluid and a proppant-containing fluid in an alternating order into a subterranean formation.

14 Claims, 8 Drawing Sheets

(56) References Cited

U.S. PATENT DOCUMENTS

| | | |
|---|---|---|
| 5,807,812 A | 9/1998 | Smith et al. |
| 5,962,068 A | 10/1999 | Tsuchiya et al. |
| 6,417,425 B1 | 7/2002 | Whitmore et al. |
| 6,454,003 B1 | 9/2002 | Chang et al. |
| 6,729,402 B2 | 5/2004 | Chang et al. |
| 6,776,235 B1 * | 8/2004 | England ............... E21B 43/267 |
| | | 166/271 |
| 6,984,705 B2 | 1/2006 | Chang et al. |
| 7,081,439 B2 | 7/2006 | Sullivan et al. |
| 7,279,446 B2 | 10/2007 | Colaco et al. |
| 7,833,950 B2 | 11/2010 | Willberg et al. |
| 7,842,741 B2 | 11/2010 | Engelhardt et al. |
| 7,923,417 B2 | 4/2011 | Sanders et al. |
| 7,947,630 B2 | 5/2011 | Atkins et al. |
| 8,178,476 B2 | 5/2012 | Xie et al. |
| 2006/0032633 A1 * | 2/2006 | Nguyen .................. C09K 8/68 |
| | | 166/280.2 |
| 2006/0211580 A1 | 9/2006 | Wang et al. |
| 2008/0277112 A1 | 11/2008 | Welton et al. |
| 2009/0062157 A1 | 3/2009 | Munoz, Jr. et al. |
| 2009/0088347 A1 | 4/2009 | Mukhopadhyay et al. |
| 2010/0075871 A1 | 3/2010 | Engelhardt et al. |
| 2010/0089581 A1 * | 4/2010 | Nguyen ................ C09K 8/685 |
| | | 166/280.2 |
| 2011/0039737 A1 * | 2/2011 | Schmidt ................. C04B 26/30 |
| | | 507/224 |
| 2011/0067868 A1 * | 3/2011 | Le Roy-Delage .. C04B 24/2652 |
| | | 166/293 |
| 2012/0018162 A1 | 1/2012 | Tanguay et al. |
| 2012/0073812 A1 | 3/2012 | Cochran |
| 2012/0225800 A1 * | 9/2012 | Hendrickson .......... C09K 8/805 |
| | | 507/211 |
| 2012/0305247 A1 | 12/2012 | Chen et al. |
| 2013/0248191 A1 * | 9/2013 | Nguyen ................ C09K 8/685 |
| | | 166/308.1 |
| 2014/0060829 A1 * | 3/2014 | Nguyen .................. C09K 8/80 |
| | | 166/280.1 |

FOREIGN PATENT DOCUMENTS

| | | |
|---|---|---|
| WO | 9963924 A1 | 12/1999 |
| WO | 2010071584 A1 | 6/2010 |

OTHER PUBLICATIONS

"Sustainable Fracking?", TouGas Oilfield Solutions GmbH, published by Frankfurter Allgemeine Zeitung GmbH, dated Sep. 4, 2013, one page.

International Search Report; International Application No. PCT/US2014/036308; International Filing Date: May 1, 2014; dated Aug. 27, 2014; 4 pages.

* cited by examiner

Left: sample K; Right: sample L
Time = 0, Room Temperature

Left: sample K; Right: sample L
Time = 24 hours, Room Temperature

HYDRAULIC FRACTURING COMPOSITION, METHOD FOR MAKING AND USE OF SAME

CROSS-REFERENCE TO RELATED APPLICATION

This application is a continuation-in-part application of U.S. Nonprovisional patent application Ser. No. 13/888,457, filed May 7, 2013, published as US 20140332214, the content of which is incorporated by reference in its entirety herein.

BACKGROUND

Hydraulic fracturing increases the flow of desirable fluids such as oil and gas from a subterranean formation and involves placing a fracturing fluid into a subterranean formation or zone at a rate and pressure sufficient to impart a stress in the formation or zone with attendant production of a fracture in the formation or zone. Some fracturing fluids contain a viscosifying or gelling agent such as a polysaccharide that breaks shortly before or after placement in the formation.

Beyond creating the fracture, the fracturing fluid also transports a proppant into the fracture. The proppant is supposed to keep the fracture open after release of the hydraulic pressure. Further, the proppant establishes conductive channels in which the desirable fluids flow to the borehole. Since the proppant provides a higher conductivity than the surrounding rock, the fracture has greater potential for production of hydrocarbons. However, some fracturing fluids break before the fracture closes, and the proppant separates from the fracturing fluid and settles at the bottom of the fracture. In this situation, the proppants settle and concentrate at the bottom of the fracture, and thus the geometry of the fracture and well productivity is impaired.

Accordingly, compositions and methods that provide relatively high permeability and that enhance the production of hydrocarbons from fractured formations are highly desired.

BRIEF DESCRIPTION

The above and other deficiencies are overcome by, in an embodiment, a hydraulic fracturing composition comprising: a superabsorbent polymer in an expanded state and configured to break in response to a breaking condition; a plurality of proppant particles disposed in the superabsorbent polymer prior to release of the plurality of proppant particles from the superabsorbent polymer in response to breaking the superabsorbent polymer; an additive comprising a surfactant, a viscous polymer, or a combination thereof and a fluid to expand the superabsorbent polymer into the expanded state.

In an embodiment, a process for disposing a plurality of proppant particles in a fracture comprises: disposing a hydraulic fracturing composition in a downhole environment, the hydraulic fracturing composition comprising: a superabsorbent polymer in an expanded state and configured to break in response to a breaking condition, such that a decomposed polymer is formed from breaking the superabsorbent polymer; a plurality of proppant particles disposed in the superabsorbent polymer prior to release of the plurality of proppant particles from the superabsorbent polymer in response to breaking the superabsorbent polymer; and an additive comprising a surfactant, a viscous polymer, or a combination thereof; and a fluid to expand the superabsorbent polymer into the expanded state; forming a fracture in the downhole environment; disposing the hydraulic fracturing composition in the fracture; breaking the superabsorbent polymer after forming the fracture; and releasing the plurality of proppant particles from superabsorbent polymer to dispose the plurality of proppant particles in the fracture.

In another embodiment, a process for disposing a plurality of proppant particles in a fracture comprises: injecting a proppant-free fluid and a proppant-containing fluid in an alternating order into a subterranean formation; wherein the proppant-free fluid comprises an aqueous carrier comprising water, brine, an acid, or a base; and a lubricant; and the proppant-containing fluid comprises a superabsorbent polymer in an expanded state and configured to break in response to a breaking condition; a plurality of proppant particles disposed in the superabsorbent polymer prior to release of the plurality of proppant particles from the superabsorbent polymer in response to breaking the superabsorbent polymer; and a fluid to expand the superabsorbent polymer into the expanded state.

In yet another embodiment, a process for disposing a plurality of proppant particles in a fracture comprises: injecting a proppant-free fluid and a proppant-containing fluid in an alternating order into a subterranean formation; wherein the proppant-free fluid comprises an aqueous carrier comprising water, brine, an acid, a base; and a lubricant; and the proppant-containing fluid comprises a superabsorbent polymer in an expanded state and configured to break in response to a breaking condition; a plurality of proppant particles disposed in the superabsorbent polymer prior to release of the plurality of proppant particles from the superabsorbent polymer in response to breaking the superabsorbent polymer; and a fluid to expand the superabsorbent polymer into the expanded state.

BRIEF DESCRIPTION OF THE DRAWING

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that a hydraulic fracturing composition described herein creates fractures in a formation and transports proppant particles into the fractures without changing the geometry of the fractures so that hydrocarbon transmission through the fractures and recovery are optimized. The proppant particles remain suspended in the hydraulic fracturing composition without settling to the bottom of the fractures, which enhances production from a well.

Figure 1:
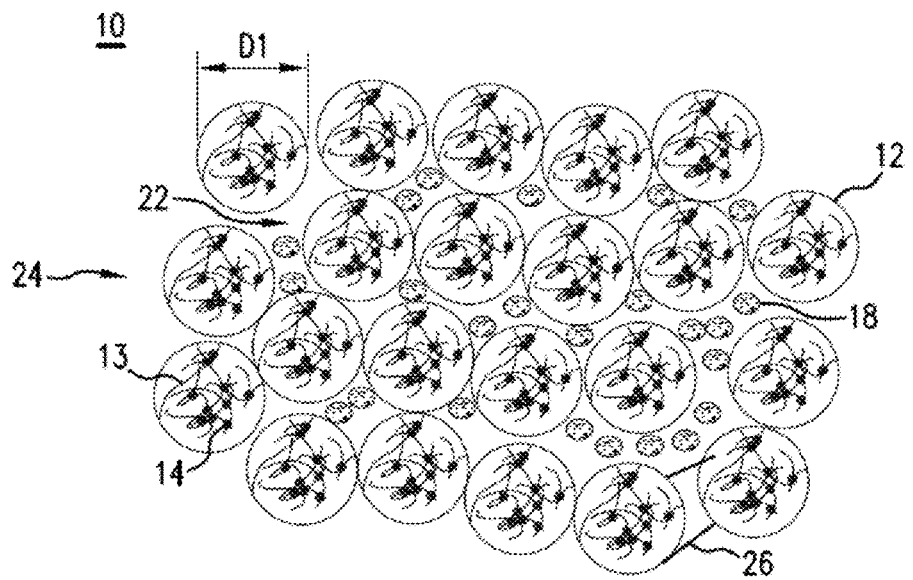
FIG. 1 shows proppant particles disposed in a superabsorbent polymer in an expanded state according to an embodiment.

As shown in FIG. 1, the hydraulic fracturing composition 10 includes a superabsorbent polymer 12 (e.g., a plurality of superabsorbent polymer particles 12), a plurality of proppant particles 18 disposed in the superabsorbent polymer 12, and a fluid (not shown) to expand the superabsorbent polymer 12 into the expanded state. In the expanded state, the superabsorbent polymer 12 is configured to break in response to a breaking condition, and a decomposed polymer is formed from breaking the superabsorbent polymer 12. Upon breaking of the superabsorbent polymer 12, the plurality of proppant particles 18 are released from the superabsorbent polymer 12.

The superabsorbent polymer 12 includes a plurality of polymer chains 13 having internal crosslinks 14 between the polymer chains 13 of the superabsorbent polymer 12. In an embodiment, the proppant particles 18 are included in a space 22 between adjacent superabsorbent polymer particles 12. In some embodiments, the proppant particles 18 are disposed in the space 22 and confined by intra-particle crosslinks 26 of the superabsorbent polymer particles 12. It is contemplated that the fluid surrounds an exterior 24 of the superabsorbent polymer 12, its interior space 22, inside the particles 12, or a combination thereof.

The superabsorbent polymer 12 is a crosslinked, neutralized or partially neutralized polymer that is capable of absorbing large amounts of aqueous liquids, such as water, brine, acid, or base, with swelling and the formation of a gel or viscous material, and retains the absorbed fluid under a certain pressure or temperature. The superabsorbent polymer has internal crosslinks, surface crosslinks, or a combination thereof. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

The SAP has a hydrophilic network that retains large amounts of aqueous liquid relative to the weight of the SAP. In an embodiment, the SAPs herein are a variety of organic polymers that react with or absorb water and swell when contacted with an aqueous fluid. Non-limiting examples of such SAPs are a polysaccharide material (that, e.g., in a dry state, absorbs and retains a weight amount of water equal to or greater than its own weight), poly 2-hydroxyethylacrylate, polyalkyl acrylate, polyacrylamide, poly methacrylamide, poly vinylpyrrolidone, and poly vinyl acetate. In one embodiment, the SAP is a copolymer of acrylamide with, for example, maleic anhydride, vinyl acetate, ethylene oxide, ethylene glycol, acrylonitrile, or a combination thereof. Production of SAPs are, e.g., from acrylamide (AM) or acrylic acid and its salts.

In an embodiment, the SAP is polymerized from nonionic, anionic, cationic monomers, or a combination thereof. Polymerization to form the SAP can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for making the SAP include nonionic monomers such as acrylamide, methacrylamide, N,N-di($C_1$-$C_8$ alkyl)acrylamide such as N,N-dimethylacrylamide, vinyl alcohol, vinyl acetate, allyl alcohol, hydroxyethyl methacrylate, acrylonitrile, and derivatives thereof. Such derivatives include, for example, acrylamide derivatives, specifically alkyl-substituted acrylamides or aminoalkyl-substituted derivatives of acrylamide or methacrylamide, and are more specifically acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide, N-tert-butylacrylamide, N-vinylformamide, N-vinylacetamide, acrylonitrile, methacrylonitrile, or a combination thereof.

Examples of anionic monomers for making the SAP include ethylenically unsaturated anionic monomers containing acidic groups including a carboxylic group, a sulfonic group, a phosphonic group, a salt thereof, a derivative thereof, or a combination thereof. In an embodiment, the anionic monomer is acrylic acid, methacrylic acid, ethacrylic acid, maleic acid, maleic anhydride, fumaric acid, itaconic acid, α-chloroacrylic acid, β-cyanoacrylic acid, β-methylacrylic acid (crotonic acid), α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulphonic acid, allyl sulphonic acid, vinyl sulphonic acid, allyl phosphonic acid, vinyl phosphonic acid, or a combination thereof.

Examples of cationic monomers for making the SAP include an N,N-di-$C_1$-$C_8$ alkylamino-$C_1$-$C_8$ alkylacrylate (e.g., N,N-dimethyl amino ethyl acrylate), N,N-di-$C_1$-$C_8$ alkylamino-$C_1$-$C_8$ alkylmethacrylate (e.g., N,N-dimethyl amino ethyl methacrylate), including a quaternary form (e.g., methyl chloride quaternary forms), diallyldimethyl ammonium chloride, N,N-di-$C_1$-$C_8$ alkylamino-$C_1$-$C_8$ alkylacrylamide, and a quaternary form thereof such as acrylamidopropyl trimethyl ammonium chloride.

In an embodiment, the SAP is an amphoteric SAP, containing both cationic substituents and anionic substituents. The cationic substituents and anionic substituents occur in various stoichiometric proportions, including one-to-one, or one substituent is present in a greater stoichiometric amount than the other substituent. Representative amphoteric SAPs include terpolymers of nonionic monomers, anionic monomers and cationic monomers.

In an embodiment, the SAP includes a guar gum and carrageenan. Suitable materials include those disclosed in Japanese Patent Application No. P2003-154262A.

According to an embodiment, the guar gum used in the SAP includes natural guar gum as well as enzyme treated guar gum; the latter having been obtained by treating natural guar gum with galactosidase, mannosidase, or another enzyme. The guar gum may further be a galactomannan derivative prepared by treating natural guar gum with chemicals to introduce carboxyl groups, hydroxyl alkyl groups, sulfate groups, phosphate groups, and the like. In addition, in an embodiment, a natural polysaccharide, other than guar and carrageenan, is included. Exemplary natural polysaccharides include starch, cellulose, xanthan gum, agar, pectin, alginic acid, tragacanth gum, pluran, gellan gum, tamarind seed gum, cardlan, gum arabic, glucomannan, chitin, chitosan, hyaluronic acid, and the like.

Carrageenan is an ionic linear polysaccharide that includes repeating galactose units that individually may be sulfated or unsulfated. Specific carrageenan types include kappa, iota, lambda, and the like. In some embodiments, a mixture of carrageenan types is used. In a specific embodiment, a carrageenan or a carrageenan-like material that form a gel is used. In addition to natural carrageenan, suitable carrageenans include enzyme-treated substances of natural carrageenan or derivatized carrageenan, e.g., those prepared by treating natural carrageenan (e.g., with a chemical) to introduce a functional group (e.g., a carboxyl group, hydroxyl alkyl group, sulfate group, phosphate group, and the like).

The SAP includes a plurality of crosslinks among the polymer chains of the SAP. According to an embodiment, the crosslinks are covalent and result from crosslinking the SAP with a crosslinker. In an embodiment, the crosslinker is an ethylenically unsaturated monomer that contains, e.g., two sites of ethylenic unsaturation (i.e., two ethylenically unsaturated double bonds), an ethylenically unsaturated double bond and a functional group that is reactive toward a functional group (e.g., an amide group) of the polymer chains of the SAP, or several functional groups that are reactive toward functional groups of the polymer chains of the SAP. In an embodiment, the degree of crosslinking in the SAP herein is selected to control the amount of swelling (i.e., fluid absorption or volume expansion) of the SAP.

Exemplary crosslinkers include a diacrylamide or methacrylamide of a diamine such as a diacrylamide of piperazine; an acrylate or methacrylate ester of a di, tri, tetrahydroxy compound including ethyleneglycol diacrylate, polyethyleneglycol diacrylate, trimethylopropane trimethacrylate, ethoxylated trimethylol triacrylate, ethoxylated pentaerythritol tetracrylate, and the like; a divinyl or diallyl compound separated by an azo group such as a diallylamide of 2,2'-azobis(isbutyric acid) or a vinyl or allyl ester of a di or tri functional acid. Additional crosslinkers include water soluble diacrylates such as poly(ethylene glycol) diacrylate (e.g., PEG 200 diacrylate) or PEG 400 diacrylate and polyfunctional vinyl derivatives of a polyalcohol such as ethoxylated (9-20) trimethylol triacrylate. Further examples of the crosslinker include aliphatic unsaturated amides, such as methylenebisacrylamide or ethylenebisacrylamide; aliphatic esters of polyols or alkoxylated polyols with ethylenically unsaturated acids, such as di(meth)acrylates or tri(meth)acrylates of butanediol, ethylene glycol, polyglycols, trimethylolpropane; di- and triacrylate esters of trimethylolpropane (which is oxyalkylated (such as ethoxylated) with an alkylene oxide such ethylene oxide); acrylate and methacrylate esters of glycerol or pentaerythritol; acrylate and methacrylate esters of glycerol and pentaerythritol oxyethylated with, e.g., ethylene oxide; allyl compounds (such as allyl(meth)acrylate, alkoxylated allyl(meth)acrylate reacted with, e.g., ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid); or monomers that are capable of crosslinking, such as N-methylol compounds of unsaturated amides, such as of methacrylamide or acrylamide, and the ethers derived therefrom. A combination of the crosslinkers also can be employed.

In an embodiment, the SAP is a particle (or fiber or other format) that includes surface crosslinks, which occur external to the interior of the SAP. The surface crosslinks, e.g., result from addition of a surface crosslinker to the SAP particle and heat-treatment. The surface crosslinks increase the crosslink density of the SAP near its surface with respect to the crosslinking density of the interior of the SAP. Some surface crosslinkers have a functional group that is reactive toward a group of the polymer chains of the SAP, e.g., an acid or amide group. The surface crosslinker are one of the previously mentioned crosslinkers and include a functional group such as an alcohol, amine, aldehyde, or carboxylate group. In an embodiment, surface crosslinkers have multiple different functional groups such as polyols, polyamines, polyaminoalcohols, and alkylene carbonates. Ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, and propylene carbonate can be used. The surface crosslinkers also provide the SAP with a chemical property that the polymer chains of the SAP did not have before surface crosslinking and control chemical properties of the SAP, e.g., hydrophobicity, hydrophilicity, or adhesiveness of the SAP to other materials such as minerals (e.g., silicates) or other chemicals such as petroleum compounds (e.g., hydrocarbons, asphaltene, and the like). Other crosslinkers include borate, titanate, zirconate, aluminate, chromate, or a combination thereof. Boron crosslinkers include, e.g., boric acid, sodium tetraborate, encapsulated borates, and the like. In some embodiments, borate crosslinkers are used with buffers and pH control agents such as sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents such as sorbitol, aldehydes, sodium gluconate, and the like. Zirconium crosslinkers, e.g., zirconium lactates (e.g., sodium zirconium lactate), triethanolamines, 2,2'-iminodiethanol, or a combination thereof are used in certain embodiments. Titanates for crosslinking include, e.g., lactates and triethanolamines, and the like.

Figure 2:
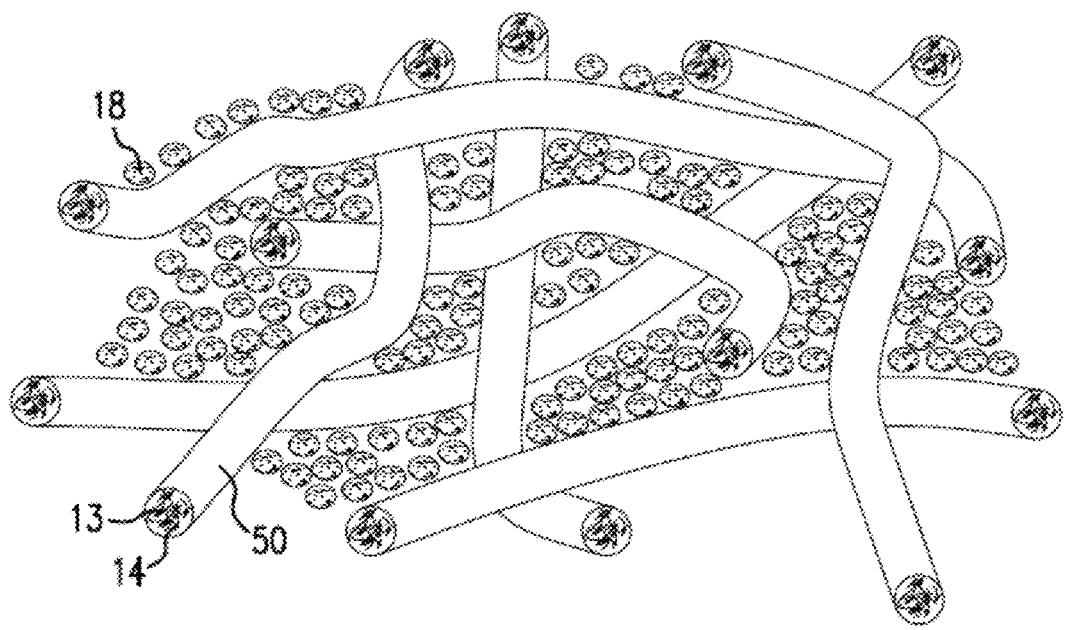
FIG. 2 shows proppant particles disposed in a superabsorbent polymer in an expanded state according to an embodiment.

In an embodiment, the SAP includes a repeat unit that comprises an acrylate, an acrylamide, a vinylpyrrolidone, a vinyl ester (e.g., a vinyl acetate), a vinyl alcohol, a derivative thereof, or a combination thereof. According to an embodiment, the SAP is polyacrylamide having crosslinks that are polyethylene glycol diacrylate. In some embodiments, the SAP is polyacrylic acid, wherein the crosslinks are vinyl ester oligomer. In an embodiment, the SAP is poly(acrylic acid) partial sodium salt graft poly(ethylene glycol), which is commercially available from Sigma Aldrich. Further, the SAP can be in a number of formats, including a particle (e.g., a powder), fiber, strand, braid, and the like, or a combination thereof. The size of the SAP is from 10 µm to 100,000 µm, specifically 50 µm to 10,000 µm, and more specifically 50 µm to 1,000 µm. As used herein, "size" refers to the largest linear dimension, e.g., a diameter in a spherical particle. Particles of the SAP are any shape including spherical, angular, and polyhedral. According to an embodiment, the SAP is a particle with pores or spaces between the polymer chains of the SAP that admits entrance of a fluid or proppant particle therein. The hydraulic fracturing composition includes a plurality of SAP particles (or other format such as fiber or braid) that coalesces together and form a single mass of SAP, herein also referred to as the superabsorbent polymer (SAP). Moreover, although FIG. 1 shows the SAP as a plurality of superabsorbent polymer particles 12, the SAP is a plurality of superabsorbent polymer fibers 12 as shown in FIG. 2 in some embodiments. A combination of the various formats of the SAP is contemplated for some embodiments.

The SAP with crosslinks is useful as a carrier for a fluid or proppant particles. In a fracturing operation (e.g., hydraulic fracturing), the proppant particles disposed in the SAP remain in the fracture and prop open the fracture when pressure used to form the fracture is released as SAPs are broken in response to the breaking condition. The proppant particles have a size from 1 µm to 2000 µm, specifically 10 µm to 1000 µm, and more specifically 10 µm to 500 µm. Further, the proppant particles have any shape including spherical, angular, and polyhedral and are monodisperse or polydisperse with an average particle size distribution that is unimodal or multimodal, e.g., bimodal.

In an embodiment, due to the relative size of the SAP and the proppant particles, the proppant particles are disposed between neighboring SAP particles (FIG. 1 item) 12 or fibers (FIG. 2 item 12), e.g., in pores or channels formed by voids or spaces 22 between such adjacent SAP particles or fibers or are disposed within individual SAP particles or fibers in the expanded state of the SAP.

The proppant particles include a ceramic, sand, a mineral, a nut shell, gravel, glass, resinous particles, polymeric particles, or a combination thereof. In an embodiment, the proppant particles are selected depending on the particular application of the hydraulic fracturing composition. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Badger sand, Brady sand, and Ottawa sand. In an embodiment, the proppant particles made of a mineral such as bauxite are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles include cured, partially cured, or uncured coatings of, e.g., a thermoset or thermoplastic resin. Curing the coating on the proppant particles occurs before or after disposal of the proppant particles in the SAP or before or after disposal of the hydraulic fracturing composition downhole, for example.

In an embodiment, the coating is an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof.

In an embodiment, the curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In an embodiment, the proppant particles include a crosslinked coating. The crosslinked coating typically provides crush strength, or resistance, for the proppant particles and prevents agglomeration of the proppant particles even under high pressure and temperature conditions. In some embodiments, the proppant particles have a curable coating, which cure subsurface, e.g. downhole or in a fracture. The curable coating cures under the high pressure and temperature conditions in the subsurface reservoir. Thus, the proppant particles having the curable coating are used for high pressure and temperature conditions.

According to an embodiment, the coating is disposed on the proppant particles by mixing in a vessel, e.g., a reactor. Individual components, e.g., the proppant particles and resin materials (e.g., reactive monomers used to form, e.g., an epoxy or polyamide coating) are combined in the vessel to form a reaction mixture and are agitated to mix the components. Further, the reaction mixture is heated at a temperature or at a pressure commensurate with forming the coating. In another embodiment, the coating is disposed on the particle via spraying such as by contacting the proppant particles with a spray of the coating material. The coated proppant particles are heated to induce crosslinking of the coating.

In addition to the proppant particles and the SAP, the hydraulic fracturing composition includes a breaker in some embodiments. The breaker contacts the SAP to break the SAP. In an embodiment, the breaker contacts the SAP and breaks a bond in the backbone of the polymer chains of the SAP, a bond in the crosslinker, a bond between the crosslinker and a polymer chain of the SAP, or a combination thereof. That is, breaking the SAP includes disintegrating, decomposing, or dissociating the SAP such as by breaking bonds in the backbone of the SAP, breaking crosslinks among chains of the SAP, changing a geometrical conformation of the superabsorbent polymer, or a combination thereof. In this way, the viscosity of the hydraulic fracturing composition decreases. In some embodiments, the breaker breaks the SAP to form a decomposed polymer such as a plurality of fragments that have a lower molecular weight than the SAP. After breaking the SAP, the plurality of proppant particles is released from the SAP.

According to an embodiment, the breaker includes an oxidizer such as a peroxide, a persulfate, a perphosphate, a perborate, a percarbonate, a persilicate, anoxyacid of a halogen, an oxyanion of halogen, a peracid, a derivative thereof, or a combination thereof.

In one embodiment, the breaker is persulfate, such as sodium persulfate, ammonium persulfate, potassium persulfate, potassium peroxymonosulfate (Caro's acid), or a combination thereof. The breaker is, e.g., an oxyacid or oxyanion of halogen, for instance, hypochlorous acid, a hypochlorite, chlorous acid and chlorites, chloric acid and chlorates, perchloric acid and perchlorate, a derivative thereof, or a combination thereof.

In an embodiment, a peroxide breaker has oxygen-oxygen single bonds in its molecular structure. The peroxide breaker is hydrogen peroxide or another material to provide peroxide or hydrogen peroxide for breaking the SAP. Metal peroxides such as sodium peroxide, calcium peroxide, zinc peroxide, magnesium peroxide, or other peroxides such as superoxides, organic peroxides, and the like can be used.

Additionally, in an embodiment, the peroxide breaker is a stabilized peroxide breaker with the hydrogen peroxide bound, inhibited, or the like by another compound or molecule prior to contact with, e.g., an aqueous fluid such as water such that it forms or releases hydrogen peroxide when contacted by the aqueous fluid. Exemplary stabilized peroxide breakers include an adduct of hydrogen peroxide with another molecule and include carbamide peroxide or urea peroxide ($C(=O)(NH_2)_2 \cdot H_2O_2$), a percarbonate (e.g., sodium percarbonate ($2Na_2CO_3 \cdot 3H_2O_2$), potassium percarbonate, ammonium percarbonate, and the like), and the like. The stabilized peroxide breakers also include compounds that undergo hydrolysis in water to release hydrogen peroxide, e.g., sodium perborate. In an embodiment, hydrogen peroxide stabilized with appropriate surfactants also is used as the stabilized peroxide breaker.

According to an embodiment, the breaker is the peracid, e.g., peracetic acid, perbenzoic acid, a derivative thereof, or a combination thereof. Additionally, a variety of peroxycarboxylic acids is employed as the peracid breaker. The peroxycarboxylic acid includes an ester peroxycarboxylic acid, an alkyl ester peroxycarboxylic acid, a sulfoperoxycarboxylic acid, or a combination thereof. Peroxycarboxylic acid (or percarboxylic acid) are acids having a general formula $R(CO_3H)_n$. In an embodiment, the R group is saturated or unsaturated as well as substituted or unsubstituted. As described herein, R is an alkyl, alkenyl, arylalkyl, arylalkenyl, cycloalkyl, cycloalkenyl, aromatic, heterocyclic, or ester group, or a combination thereof (e.g., an alkyl ester group), with n being 1, 2, or 3. Exemplary ester groups include aliphatic ester groups, such as $R^1OC(O)R^2$, where $R^1$ and $R^2$ independently are a group (e.g., an alkyl group) described above for R such that $R^1$ and $R^2$ are, e.g., independently small carbon chain alkyl groups, such as a $C_1$-$C_5$ alkyl group.

One skilled in the art will appreciate that peroxycarboxylic acids may not be as stable as carboxylic acids, and their stability may increase with increasing molecular weight. Thermal decomposition of the peracids proceed by, e.g., free radical and nonradical paths, by photodecomposition or radical-induced decomposition, or by the action of metal ions or complexes. In an embodiment, the percarboxylic acid peracids are made by direct, acid catalyzed equilibrium action of hydrogen peroxide with a carboxylic acid, by autoxidation of aldehydes, or from acid chlorides, and hydrides, or carboxylic anhydrides with hydrogen or sodium peroxide.

Exemplary peroxycarboxylic acids include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxycitric, peroxymaleic, peroxyascorbic, peroxyhydroxyacetic (peroxyglycolic), peroxyoxalic, peroxymalonic, peroxysuccinic, peroxyglutaric, peroxyadipic, peroxypimelic, peroxysuberic, peroxysebacic acid, and the like.

In an embodiment, the peracid includes a combination of several peroxycarboxylic acids. According to one embodiment, the composition includes a $C_2$-$C_4$ peroxycarboxylic acid, a $C_8$-$C_{12}$ peroxycarboxylic acid, an ester peroxycarboxylic acid, an alkyl ester peroxycarboxylic acids, or a mono- or di-peroxycarboxylic acid having up to 12 carbon atoms, and more specifically 2 to 12 carbon atoms. In an embodiment, the peroxycarboxylic acid includes peroxyacetic acid (POAA) (i.e., peracetic acid having the formula $CH_3COOOH$) or peroxyoctanoic acid (POOA) (i.e., peroctanoic acid having the formula, e.g., of n-peroxyoctanoic acid: $CH_3(CH_2)_6COOOH$).

In an embodiment, the peracid is an ester peroxycarboxylic acid. As used herein, ester peroxycarboxylic acid refers to a molecule having the formula:

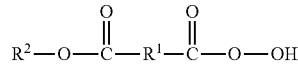

wherein R¹ and R² are independently an organic group (e.g., alkyl, linear or cyclic, aromatic or saturated) or a substituted organic group (e.g., with a heteroatom or organic group). In an embodiment, the ester peroxycarboxylic acid is made by employing methods used for making peroxycarboxylic acid such as combining the corresponding ester carboxylic acid with an oxidizing agent, e.g., hydrogen peroxide.

Exemplary alkyl esterperoxycarboxylic acids include monomethyl monoperoxyglutaric acid, monomethyl monoperoxyadipic acid, monomethyl monoperoxyoxalie acid, monomethyl monoperoxymalonic acid, monomethyl monoperoxysuccinic acid, monomethyl monoperoxypimelic acid, monomethyl monoperoxysuberic acid, and monomethyl monoperoxysebacic acid; mono ethyl monoperoxyoxalic acid, monoethyl monoperoxymalonic acid, monoethyl monoperoxysuccinic acid, monoethyl monoperoxyglutaric acid, monoethyl monoperoxyadipic acid, monoethyl monoperoxypimelic acid, monoethyl monoperoxysuberic acid, and monoethyl monoperoxysebacic acid; monopropyl monoperoxyoxalic acid, monopropyl monoperoxymalonic acid, monopropyl monoperoxysuccinic acid, monopropyl monoperoxyglutaric acid, monopropyl monoperoxyadipic acid, monopropyl monoperoxypimelic acid, monopropyl monoperoxysuberic acid, monopropyl monoperoxysebacic acid, in which propyl is n- or isopropyl; monobutyl monoperoxyoxalic acid, monobutyl monoperoxymalonic acid, monobutyl monoperoxysuccinic acid, monobutyl monoperoxyglutaric acid, monobutyl monoperoxyadipic acid, monobutyl monoperoxypimelic acid, monobutyl monoperoxysuberic acid, monobutyl monoperoxysebacic acid, in which butyl is n-, iso-, or t-butyl; and the like.

In some embodiments, the peracid breaker is a sulfoperoxycarboxylic acid. Sulfoperoxycarboxylic acids, which also are referred to as sulfonated peracids, include the peroxycarboxylic acid form of a sulfonated carboxylic acid. In some embodiments, the sulfonated peracid is a mid-chain sulfonated peracid, i.e., a peracid that includes a sulfonate group attached to a carbon that is at least one carbon (e.g., at least the three position) from the carbon of the percarboxylic acid group in the carbon backbone of the percarboxylic acid chain, wherein the at least one carbon is not in the terminal position. As used herein, the term "terminal position" refers to the carbon on the carbon backbone chain of a percarboxylic acid that is furthest from the percarboxyl group. Thus, in an embodiment, sulfoperoxycarboxylic acid has the following formula:

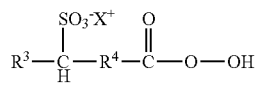

wherein $R^3$ is hydrogen or a substituted or unsubstituted alkyl group; $R^4$ is a substituted or unsubstituted alkyl group; X is hydrogen, a cationic group, or an ester forming moiety; or salts or esters thereof.

In some embodiments, $R^3$ is a substituted or unsubstituted $C_m$ alkyl group; X is hydrogen, a cationic group, or an ester forming moiety; $R^4$ is a substituted or unsubstituted $C_n$ alkyl group; m=1 to 10; n=1 to 10; and m+n is less than 18; or salts, esters, or a combination thereof. In some embodiments, $R^3$ is hydrogen. In other embodiments, $R^3$ is a substituted or unsubstituted alkyl group. In some embodiments, $R^3$ is a substituted or unsubstituted alkyl group that does not include a cycloalkyl group. In some embodiments, $R^3$ is a substituted alkyl group. In some embodiments, $R^3$ is an unsubstituted $C_1$-$C_9$ alkyl group. In some embodiments, $R^3$ is an unsubstituted $C_7$ or $C_8$ alkyl. In other embodiments, $R^3$ is a substituted $C_8$-$C_{10}$ alkyl group. In some embodiments, $R^3$ is a substituted $C_8$-$C_{10}$ alkyl group and is substituted with at least 1, or at least 2 hydroxyl groups. In still yet other embodiments, $R^3$ is a substituted $C_1$-$C_9$ alkyl group. In some embodiments, $R^3$, is a substituted $C_1$-$C_9$ substituted alkyl group and is substituted with an —$SO_3H$ group. In other embodiments, $R^3$ is a $C_9$-$C_{10}$ substituted alkyl group. In some embodiments, $R^3$ is a substituted $C_9$-$C_{10}$ alkyl group wherein at least two of the carbons on the carbon backbone form a heterocyclic group. In some embodiments, the heterocyclic group is an epoxide group.

In an embodiment, $R^4$ is a substituted $C_1$-$C_{10}$ alkyl group. In some embodiments, $R^4$ is a substituted $C_8$-$C_{10}$ alkyl. In some embodiments, $R^4$ is an unsubstituted $C_6$-$C_9$ alkyl. In other embodiments, $R^4$ is a $C_8$-$C_{10}$ alkyl group substituted with at least one hydroxyl group. In some embodiments, $R^4$ is a $C_{10}$ alkyl group substituted with at least two hydroxyl groups. In other embodiments, $R^4$ is a $C_8$ alkyl group substituted with at least one —$SO_3H$ group. In some embodiments, $R^4$ is a substituted $C_9$ group, wherein at least two of the carbons on the carbon backbone form a heterocyclic group. In some embodiments, the heterocyclic group is an epoxide group. In some, embodiments, $R^4$ is a $C_8$-$C_9$ substituted or unsubstituted alkyl, and $R^4$ is a $C_7$-$C_8$ substituted or unsubstituted alkyl.

According to an embodiment, in the hydraulic fracturing composition, the breaker is encapsulated in an encapsulating material to prevent the breaker from contacting the SAP. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the SAP. Encapsulating materials are the same or different as the coating material noted above with regard to the proppant particles. Methods of disposing the encapsulating material on the breaker are the same or different as for disposing the coating on the proppant particles. In an embodiment, a liquid breaker is dissolved in an aqueous solution or another suitable solvent.

In an embodiment, the encapsulation material is a polymer that releases the breaker in a controllable way, e.g., at a controlled rate or concentration. Such material is a polymer that degrades over a period of time to release the breaker and is chosen depending on the release rate desired. Degradation of the polymer of the encapsulation material polymer occurs, e.g., by hydrolysis, solvolysis, melting, and the like. In an embodiment, the polymer of the encapsulation material is a homopolymer or copolymer of glycolate and lactate, a polycarbonate, a polyanhydride, a polyorthoester, a polyphosphacene, or a combination thereof.

According to an embodiment, the encapsulated breaker is an encapsulated hydrogen peroxide, encapsulated metal peroxides (e.g., sodium peroxide, calcium peroxide, zinc peroxide, and the like) or any of the peracids or other breaker herein.

In the hydraulic fracturing composition, the fluid is included to contact and expand the SAP into the expanded state. The fluid is an aqueous fluid that includes water, brine, an acid such as a mineral acid or an organic acid, or a base. The brine is, for example, seawater, produced water, completion brine, or a combination thereof. The properties of the brine can depend on the identity and components of the brine. Seawater, as an example, contains numerous constituents such as sulfate, bromine, and trace metals, beyond typical halide-containing salts. In some embodiments, produced water is water extracted from a production reservoir (e.g., hydrocarbon reservoir) or produced from the ground. Produced water also is referred to as reservoir brine and contains components such as barium, strontium, and heavy metals. In addition to the naturally occurring brines (seawater and produced water), completion brine is synthesized from fresh water by addition of various salts such as KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. In an embodiment, the above brines are modified to include an additional salt. In an embodiment, the additional salt included in the brine is NaCl, KCl, NaBr, $MgCl_2$, $CaCl_2$, $CaBr_2$, $ZnBr_2$, $NH_4Cl$, sodium formate, cesium formate, and the like. The salt is present in the brine in an amount from about 0.5 weight percent (wt %) to about 50 wt %, specifically about 1 wt % to about 40 wt %, and more specifically about 1 wt % to about 25 wt %, based on the weight of the fluid.

According to an embodiment, the fluid is a mineral acid that includes hydrochloric acid, nitric acid, phosphoric acid, sulfuric acid, boric acid, hydrofluoric acid, hydrobromic acid, perchloric acid, or a combination comprising at least one of the foregoing. In some embodiments, the fluid is an organic acid that includes a carboxylic acid, sulfonic acid, or a combination thereof. Exemplary carboxylic acids include formic acid, acetic acid, chloroacetic acid, dichloroacetic acid, trichloroacetic acid, trifluoroacetic acid, proprionic acid, butyric acid, oxalic acid, benzoic acid, phthalic acid (including ortho-, meta- and para-isomers), and the like. Exemplary sulfonic acids include alkyl sulfonic acid or aryl sulfonic acid. Alkyl sulfonic acids include, e.g., methane sulfonic acid. Aryl sulfonic acids include, e.g., benzene sulfonic acid or toluene sulfonic acid. In one embodiment, the alkyl group may be branched or unbranched and contains from one to about 20 carbon atoms and is substituted or unsubstituted. In an embodiment, the aryl group is alkyl-substituted, i.e., is an alkylaryl group, or is attached to the sulfonic acid moiety via an alkylene group (i.e., an arylalkyl group). In an embodiment, the aryl group is substituted with a heteroatom. The aryl group has from 3 carbon atoms to 20 carbon atoms and includes, e.g., a polycyclic ring structure.

Besides the SAP, the hydraulic fracturing composition includes a viscose polymer in some embodiments. The viscose polymer includes guar gums, high-molecular weight polysaccharides composed of mannose and galactose sugars, xanthan gum, guar, or starch or guar derivatives such as hydropropyl guar (HPG), carboxymethyl guar (CMG), and carboxymethylhydroxypropyl guar (CMHPG), galactomannan gums, glucomannan gums, guars, derived guars, cellulose derivatives, or a combination thereof. Cellulose derivatives such as hydroxyethylcellulose (HEC), carboxymethylcellulose (CMC), hydroxypropylcellulose (HPC), and carboxymethylhydroxyethylcellulose (CM-HEC); hydropropyl starch; or lignosulfonate also is used.

According to an embodiment, the viscose polymer is includes a repeat unit that comprises an acrylate, an acrylamide, a vinylpyrrolidone, a vinyl ester (e.g., a vinyl acetate), a vinyl alcohol, a 2-acrylamide-2-methylpropanesulfonic acid, a derivative thereof, or a combination thereof. In some embodiments, the viscose polymer is polyacrylic acid.

In an exemplary embodiment, the viscose polymer comprises a linear polymer such as a polyacrylamide, a guar, a guar derivative, glycerol, a polysaccharide such as cellulose and starch, or a combination comprising at least one of the foregoing. Without wishing to be bound by theory, it is believed that the presence of a viscose polymer in the hydraulic fracturing composition increases the viscosity, thus the proppant-suspension ability of the composition. The presence of the viscose polymer also helps to reduce the friction pressure. When the hydraulic fracturing composition is a foam fluid, the viscose polymer further stabilizes the foam fluid by improving the foam quality and foam half-life.

The viscose polymer forms a viscous gel due to contact with the fluid of the hydraulic fracturing composition (or another fluid such as water, brine, or other downhole fluid). When the viscose polymer comprises glycerol, a linear polymer such as linear polyacrylamide, a guar, a guar derivative, a polysaccharide such as cellulose and starch, or a combination thereof, the formed viscous gel can be referred to as a linear gel. In some embodiments, a combination of fluids is used, a first fluid to expand the SAP and a second fluid to gel the viscose polymer. Without wishing to be bound by theory, it is believed that the viscose polymer has increased viscosity due to long polymer chains that becomes entangled. Entangled polymer chains of the viscose polymer creates networks, giving complex viscosity behavior. In an embodiment, the viscose polymer is a copolymer that contains two or more different monomers that are arranged randomly or in blocks. Moreover, the viscosity of the viscose polymer is increased by crosslinking the polymer chains of the viscose polymer. Crosslinkers for the viscose polymer include borate, titanate, zirconate, aluminate, chromate, or a combination thereof. Boron crosslinked viscose polymers include, e.g., guar and substituted guars crosslinked with boric acid, sodium tetraborate, or encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Zirconium crosslinked viscose polymers include, e.g., those crosslinked by zirconium lactates (e.g., sodium zirconium lactate), triethanolamines, 2,2'-iminodiethanol, or a combination thereof. Titanates for crosslinking include, e.g., lactates and triethanolamines, and the like.

In an embodiment, the hydraulic fracturing composition includes an SAP, for example an SAP having crosslinked polymer particles such as a polyacrylic acid, polyacrylamide, a polysaccharide, or a combination thereof; a plurality of proppant particles; a fluid to expand the SAP, and a viscose polymer. Once the SAP is combined with the fluid, it expands while maintaining its shape. The viscose polymer is a linear polymer that hydrates in the fluid and has a viscosity determined by entanglement of the hydrated linear polymer. It is contemplated that the entangled linear polymers can be crosslinked in-situ to form a crosslinked gel. Thus, the hydraulic fracturing composition has beneficial rheological properties including tunable viscosity and breaking properties.

The hydraulic fracturing composition can also comprise a surfactant. Useful surfactants include fatty acids of up to 22 carbon atoms such as stearic acids and esters and polyesters thereof, poly(alkylene glycols) such as poly(ethylene oxide), poly(propylene oxide), and block and random poly(ethylene oxide-propylene oxide) copolymers such as those marketed under the trademark PLURONIC by BASF. Other surfactants include polysiloxanes, such as homopolymers or copolymers of poly(dimethylsiloxane), including those having functionalized end groups, and the like. Other useful surfactants include those having a polymeric dispersant having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. Additionally, the surfactant is anionic, cationic, zwitterionic, or non-ionic.

Exemplary cationic surfactants include but are not limited to alkyl primary, secondary, and tertiary amines, alkanolamides, quaternary ammonium salts, alkylated imidazolium, and pyridinium salts. Additional examples of the cationic surfactant include primary to tertiary alkylamine salts such as, e.g., monostearylammonium chloride, distearylammonium chloride, tristearylammonium chloride; quaternary alkylammonium salts such as, e.g., monostearyltrimethylammonium chloride, distearyldimethylammonium chloride, stearyldimethylbenzylammonium chloride, monostearyl-bis(polyethoxy)methylammonium chloride; alkylpyridinium salts such as, e.g., N-cetylpyridinium chloride, N-stearylpyridinium chloride; N,N-dialkylmorpholinium salts; fatty acid amide salts such as, e.g., polyethylene polyamine; and the like.

Exemplary anionic surfactants include alkyl sulfates, alkyl sulfonates, fatty acids, sulfosuccinates, and phosphates. Examples of an anionic surfactant include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

In an embodiment, the nonionic surfactant is, e.g., an ethoxylated fatty alcohols, alkyl phenol polyethoxylates, fatty acid esters, glycerol esters, glycol esters, polyethers, alkyl polyglycosides, amineoxides, or a combination thereof. Exemplary nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol monononyl ethers); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); block copolymers of polyethylene glycol and polypropylene glycol (e.g., poloxamers available under the trade name Pluronics, available from BASF); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, e.g., betaines, such as alkyl ammonium carboxylates (e.g., $[(CH_3)_3N^+—CH(R)COO^-]$ or sulfonates (sulfo-betaines) such as $[RN^+(CH_3)_2(CH_2)_3SO_3^-]$, where R is an alkyl group). Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n+1}N^+(CH_2C_6H_5)(CH_3)CH_2CH_2SO_3^-]$.

In an embodiment, the surfactant is a viscoelastic surfactant. The surfactant is viscoelastic because, unlike numerous surfactants, which form Newtonian solutions with a viscosity slightly higher than water even at high concentrations, it is capable of forming viscoelastic fluids at a lower concentration. This specific rheological behavior is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle.

The viscoelastic surfactant of the invention is usually ionic. It may be cationic, anionic or zwitterionic depending on the charge of its head group. When the surfactant is cationic, it is associated with a negative counterion, which can be an inorganic anion such as a sulfate, a nitrate, a perchlorate or a halide such as Cl, Br or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na+ or K+. When it is zwitternionic, it is associated with both negative and positive counterions, for example, Cl and Na+ or K+. Other viscoelastic surfactant has been described in U.S. Pat. Nos. 7,081,439 and 7,279,446.

The hydraulic fracturing composition can be a liquid or a foam. A liquid includes a surfactant based fluid, a linear gel fluid, or a crosslinked gel fluid. A surfactant based fluid can refer to the hydraulic fracturing composition comprising a viscoelastic surfactant. A linear gel fluid can refer to the hydraulic fracturing composition comprising a linear gel. Similarly, a crosslinked gel fluid refers to the hydraulic fracturing composition comprising a crosslinked gel.

A foam fluid is a stable mixture of gas and liquid. It is generally described by its foam quality, i.e. the ratio of gas volume to the foam volume. The foam half-life is another important parameter to evaluate the stability of foam fluids. The halflife of a foam fluid is the time necessary for one-half of the liquid used to generate the foam to break out of the foam under atmospheric conditions. A foam system is mainly used in fracturing low pressure or water sensitive formations.

Water soluble polymers, such as guar gums, high-molecular weight polysaccharides composed of mannose and galactose sugars, or guar derivatives such as hydropropyl guar (HPG), carboxymethylhydropropyl guar (CMHPG), can be used to prepare the liquid phase of the foam fluids. Crosslinking agents based on boron, titanium, zirconium or aluminum complexes can be used to increase the effective molecular weight of the polymer and make them better suited for use in high-temperature wells.

Polymer-free, liquid phase of foam fluids can be obtained using viscoelastic surfactants. These fluids are normally prepared by mixing in appropriate amounts suitable surfactants such as anionic, cationic, nonionic and zwitterionic surfactants in aqueous solutions. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscosity and elastic behavior to further stabilize the foamed systems. Meanwhile, the surfactant also acts as foaming agent to create the stable dispersion of gas in viscous liquid.

In an embodiment, various additional additives are included in the hydraulic fracturing composition. Exemplary additional additives include a lubricant, a non-emulsifier, a clay stabilizer, a biocide, an acid, a corrosion inhibitor, a pH-adjusting agent, or a combination thereof.

In an embodiment, the non-emulsifier of the additive is a combination of the above surfactants or a combination of surfactant with a short chain alcohol or polyol such as lauryl sulfate with isopropanol or ethylene glycol. The non-emulsifier prevents formation of emulsions in the hydraulic fracturing composition.

In an embodiment, the additive is the lubricant such as a polyacrylamide, petroleum distillate, hydrotreated light petroleum distillate, a short chain alcohol (e.g., methanol), or polyol (e.g., ethylene glycol or glycerol). Such lubricants minimize friction and also include, e.g., a polymer such as polyacrylamide, polyisobutyl methacrylate, polymethyl methacrylate, or polyisobutylene as well as water-soluble lubricants such as guar, guar derivatives, polyacrylamide, and polyethylene oxide. In an embodiment, the lubricant comprises a guar, a guar derivative, glycerol, polyacrylamide, a polysaccharide such as cellulose and starch, or a combination comprising at least one of the foregoing.

The clay stabilizer of the additive prevents the clay downhole from swelling under contact with the hydraulic fracturing composition or applied fracturing pressure. In an embodiment, the clay stabilizer includes a quaternary amine, a brine (e.g., KCl brine), choline chloride, tetramethyl ammonium chloride, and the like.

According to an embodiment, the additive is the pH-adjusting agent, which adjusts pH of the hydraulic fracturing composition. The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination thereof. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination thereof. In an embodiment, the pH-adjusting agent is selected to avoid imparting favorable characteristics to the hydraulic fracturing composition. In an embodiment, the pH-adjusting agent is selected to avoid damage to the surface equipment containing the hydraulic fracturing composition or to avoid damaging the wellbore or subterranean formation.

In an embodiment, the additive to the hydraulic fracturing composition is the biocide that prevents injection of a microbe (e.g., bacteria) downhole. The biocide kills, eliminates, or reduces bacteria in the hydraulic fracturing composition such as water (e.g., when using river water as the fluid). In this way, introduction of live bacteria into the formation is prevented, thus reducing production of, e.g., sour gas.

According to an embodiment, the biocide does not interfere with the other components of the hydraulic fracturing composition and is not a health risk. In an embodiment, the biocide is an aldehyde such as glutaraldehyde. Examples of the biocide include non-oxidizing and oxidizing biocides. Exemplary oxidizing biocides include hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like. Additional oxidizing biocides include, e.g., bromine products like: stabilized sodium hypobromite, activated sodium bromide, or brominated hydantoins. Other oxidizing biocides include chlorine dioxide, ozone, inorganic persulfates such as ammonium persulfate, or peroxides, such as hydrogen peroxide and organic peroxides.

Exemplary non-oxidizing biocides include dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, and the like. Additional non-oxidizing biocides are quaternary ammonium salts, aldehydes and quaternary phosphonium salts. In an embodiment, quaternary biocides have a fatty alkyl group and three methyl groups, but in the phosphonium salts, the methyl groups, e.g., are substituted by hydroxymethyl groups without substantially affecting the biocidal activity. In an embodiment, they also are substituted with an aryl group. Examples include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azoniaadamantane, or a combination thereof.

In an embodiment, the biocide is encapsulated or coated as discussed above with regard to the proppant particles or breaker. In an embodiment, the biocide is encapsulated or coated by any suitable encapsulation method using any suitable encapsulation material. The encapsulation material is any material that does not adversely interact or chemically react with the biocide to destroy its utility. In an embodiment, the biocide is released from the coating at a selected time.

In the hydraulic fracturing composition, the proppant particles are present in an amount effective to prop open the fracture without the geometry of the fracture being altered during settling of the formation when the proppant is released from the SAP. In a particular embodiment, the proppant particles are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the composition. In an embodiment, the SAP is present in a mass concentration from 1 pound of SAP per one thousand gallons of fluid (ppt) to 200 ppt, specifically 5 ppt to 100 ppt, and more specifically 15 ppt to 50 ppt, based on the total volume of the composition. In the hydraulic fracturing composition, any ratio of the amount of the proppant particles to the amount of the SAP is applicable as long as the proppant particles are suspended in the gel formed by the SAP.

In an embodiment, the breaker is present in the hydraulic fracturing composition in a mass concentration from 0 ppt to 20 ppt, specifically 0 ppt to 15 ppt, and more specifically, 0 ppt to 10 ppt, based on the total volume of the composition. In some embodiments, the biocide is present in an amount from 10 parts per million (ppm) to 2000 ppm, specifically 50 ppm to 1500 ppm, and more specifically 50 ppm to 1000 ppm. An amount of the viscose polymer, if present, is from 0.25 gallons of viscose polymer per 1000 gallons of fluid (gpt) to 10 gpt, specifically 0.5 gpt to 8 gpt, and more specifically 0.5 gpt to 4 gpt, based on the total hydraulic fracturing composition volume.

Figure 3:
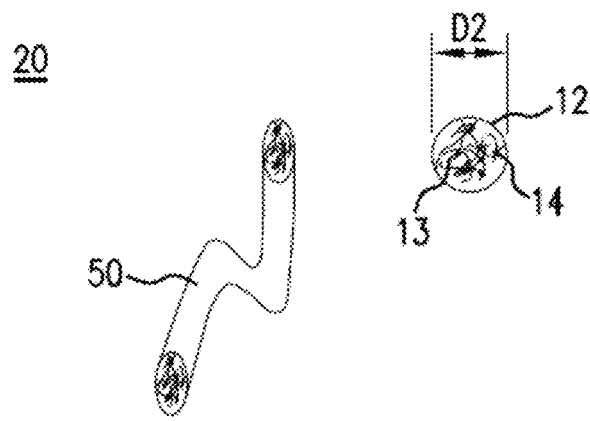
FIG. 3 shows a superabsorbent polymer in an unexpanded state.

The hydraulic fracturing composition can be made in a variety of ways. According to an embodiment, a process for making the hydraulic fracturing composition includes contacting a superabsorbent polymer with a fluid to expand the superabsorbent polymer into an expanded state and disposing a plurality of proppant particles in the superabsorbent polymer to make the hydraulic fracturing composition. As shown in FIG. 3, the SAP (e.g., particle 12 or fiber 50) is in an unexpanded state 20 with internal crosslinks 14 and has a diameter of D2 prior to contact with the fluid (not shown). As indicated in FIGS. 1 and 2, once contacted with the fluid, the SAP (12 or 50) expands to diameter D1 (where D1 is greater than D2) as the fluid is absorbed into the SAP (12 or 50). Additionally, in the case of an SAP fiber 50 or an SAP that has a major axis, the length of the SAP 50 can lengthen upon expansion caused by absorption of the fluid. It should be noted that the crosslinks 14 limit the volumetric expansion and the ultimate size of the SAP 12. In the expanded state (FIG. 1 or FIG. 2), the proppant particles 18 are disposed in the SAP (12 or 50). The SAPs (12 or 50) shown in FIG. 1, FIG. 2, and FIG. 3 represent a single particle, fiber, etc. of the SAP 12 or a plurality of such items as well as agglomerates of polymer chains that make the SAP (12 or 50).

According to an embodiment, the breaker is added to the fluid before or after disposing the SAP (12 or 50) and the proppant particles 18. Optionally, the additive is added to the SAP and proppant particles.

In an embodiment, combining the components of the hydraulic fracturing composition is accomplished in a vessel such as a mixer, blender, and the like. In some embodiments, the hydraulic fracturing composition is injected without mixing, e.g. it is injected "on the fly". The components are mixed, agitated, stirred, and the like. In an embodiment, the components are combined as the hydraulic fracturing composition is being disposed downhole.

The hydraulic fracturing composition herein has advantageous properties that include suspending the proppant particles in the SAP for an extended period of time or at an elevated temperature or pressure. The length of time, temperature, or pressure under which the proppant particles remain suspended in the SAP is determined by the polymer chains that make up the SAP as well as the crosslinker compound, degree of crosslinking, amount of proppant particles present, concentration of the SAP, and identity of the fluid.

Accordingly, the hydraulic fracturing composition includes a highly crosslinked SAP, lightly crosslinked SAP, or a combination thereof. In the hydraulic fracturing composition, the SAP is configured to be broken and to release the proppant particles in response to the breaking condition. The breaking condition includes a temperature, pH, contact between the breaker and the SAP, a time lapse between the SAP being in the expanded state and breaking the superabsorbent polymer. In an embodiment, the time the proppant particles are disposed in the SAP prior to release from the SAP is greater than or equal to 48 hours at a temperature greater than or equal to 150° F., specifically greater than or equal to 36 hours, more specifically greater than or equal to 24 hours, even more specifically greater than or equal to 18 hours, and yet more specifically from 10 minutes to 18 hours.

In an embodiment, the pH for breaking the SAP is a pH effective to break bonds in the SAP, crosslinker, between the SAP and crosslinker, or a combination thereof. Likewise, in an embodiment, the pH causes dissociation between particles of SAP so that the proppant particles are released therefrom. In an embodiment, the pH is acidic or basic so that ionic groups of the polymer chains in the SAP are neutralized, which affects the amount of fluid present in the SAP and causes contraction of the SAP and expulsion of the proppant particles. According to an embodiment, the pH is from 1 to 12, specifically 3 to 12, and more specifically 5 to 11.5.

In an embodiment, the SAP breaks due to the breaking condition even in the absence of the breaker. Thus, in an embodiment, the SAP is broken at a temperature, pH, time lapse, and the like without contact with the breaker.

In an embodiment, the viscosity of the SAP in the expanded state is from 1 centipoise (cP) to 1000 cP, and specifically 1 cP to 300 cP, as measured by Ofite M900 rheometer for less than 100 cP viscosity or Grace M5500 rheometer for more than 100 cP viscosity at a temperature of 180° F.

The hydraulic fracturing composition is useful e.g., to transport and dispose proppant particles in a fracture without the SAP being broken until after disposal of the proppant particles to prevent proppant particles from settling and therefore increase overall fractured surface area. According to an embodiment, the hydraulic fracturing composition is used to form the fracture. In an embodiment, a process for disposing a plurality of proppant particles in a fracture includes disposing a hydraulic fracturing composition in a downhole environment. The hydraulic fracturing composition includes an SAP in an expanded state and configured to break in response to a breaking condition, such that a decomposed polymer is formed from the superabsorbent polymer. The hydraulic fracturing composition also includes a plurality of proppant particles disposed in the SAP prior to release of the plurality of proppant particles from the SAP in response to breaking the SAP and a fluid to expand the SAP into the expanded state. In this method, forming a fracture in the downhole environment is accomplished by applying hydraulic force on the downhole environment from the hydraulic fracturing composition, disposing the hydraulic fracturing composition in the fracture, breaking the superabsorbent polymer after forming the fracture, and releasing the plurality of proppant particles from superabsorbent polymer to dispose the plurality of proppant particles in the fracture. In this manner, the proppant particles do not settle to the bottom of the fracture. The downhole environment is, e.g., a reservoir temperature, formation water, formation rock, sand, and the like, which contains, e.g., pores or veins of various sizes in such rock, sand, and the like.

Figure 4:
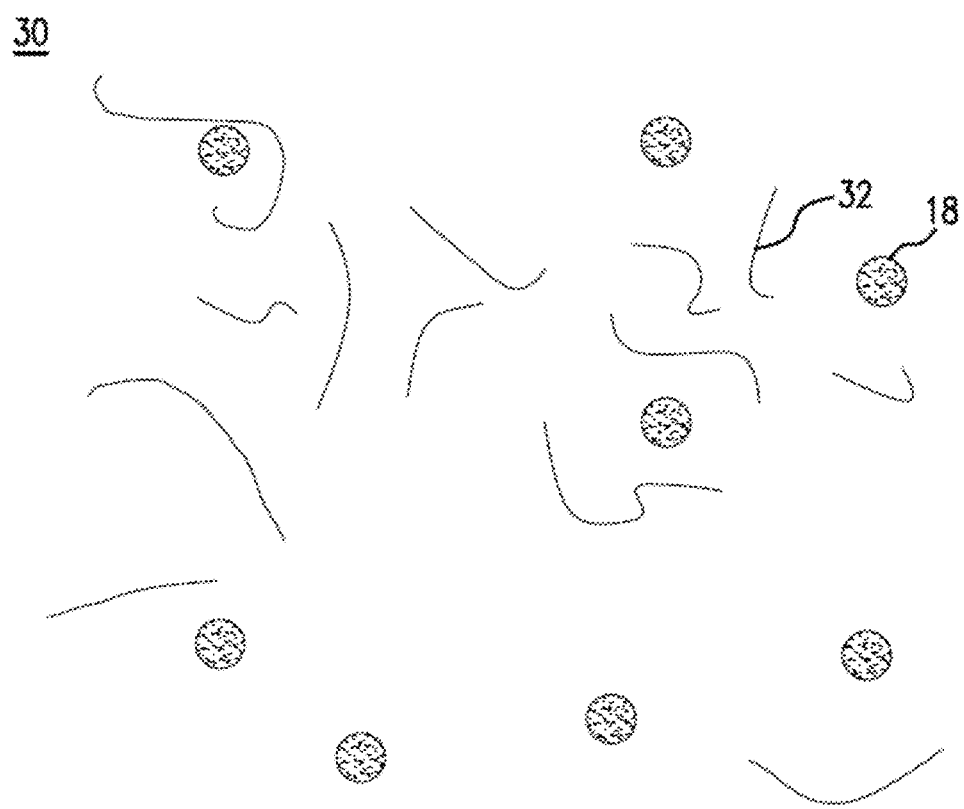
FIG. 4 shows a decomposed polymer and proppant particles.

As shown in FIG. 4, after the breaking condition occurs, the SAP is in a broken state 30 such that the SAP forms, e.g., a decomposed polymer 32 with the proppant particles 18 released from the SAP. Although the decomposed polymer 32 is shown as being separated fragments (e.g., polymers, oligomers, monomers, molecules, atoms, and the like, which are charged or charge neutral), in an embodiment, the decomposed polymer is formed from the SAP by breaking all or some of the crosslinks so that the polymer chains of the SAP remain intact. It is contemplated that conformational changes in the SAP release the proppant particles from the SAP and ensure good conductivity.

In an embodiment, the crosslinks or the SAP are degraded by certain conditions such as heat or pH. Degradation reduces the degree of crosslinking in the SAP by breaking a bond in the crosslinker or a bond between the crosslinker and polymer chains of the SAP. Generally, decreasing the degree of crosslinking of the SAP increases the amount of fluid that is absorbed by the SAP or increases the volumetric increase of the SAP due to fluid absorption. In an embodiment, the aforementioned conditions cleaves bonds in the crosslinks without substantially degrading the polymer backbone of the SAP. In some embodiments, these conditions also degrade the polymer backbone of the SAP.

In addition to disposing the hydraulic fracturing composition in the downhole environment for hydraulically fracturing the formation, the method also includes disposal of other elements such as water, a downhole fluid (e.g., brine or other above-mentioned fluids), a viscose polymer, or a combination thereof. Thus, in an embodiment, the method further includes disposing water, a viscose polymer, or a combination thereof in the downhole environment and forming the fracture with the hydraulic fracturing composition, water, the viscose polymer, or a combination thereof. The order of addition can be varied and the time of injecting each is the same or different. According to an embodiment, for hydraulically fracturing a formation, a proppant-free fluid and a proppant-containing fluid are injected in an alternating order into a subterranean formation. The proppant-free fluid can be injected first followed by the proppant-containing fluid. Alternatively, the proppant-containing fluid is injected first followed by the proppant-free fluid.

Figure 15:
FIG. 15 shows a fracture cell after alternating injection of a proppant-containing fluid comprising SPP, proppant particles, a fluid to expand the SPP, and a proppant-free fluid comprising water and a lubricant.

In an exemplary embodiment, the proppant-free fluid comprises an aqueous carrier comprising water, brine, an acid, or a base and a lubricant. The lubricant can comprise a polyacrylamide, a guar, a guar derivative, glycerol, a polysaccharide such as cellulose and starch, or a combination thereof. When the lubricant comprises a polyacrylamide, e.g. MaxPerm 20A, MaxPerm 20A is present in an amount of 0.25 to 15 gallons per one thousand gallons of the proppant-free fluid. When the lubricant comprises a guar, the lubricant is present in an amount of 1 to 50 pounds per one thousand gallons of the proppant-free fluid. The proppant-containing fluid comprises SPP, a plurality of proppant particles disposed in SPP, a fluid to expand the SPP into the expanded state, and optionally a linear gel or a viscose polymer comprising a guar, a guar derivative, a polyacrylamide, glycerol, a polysaccharide, or a combination comprising at least one of the foregoing. The proppant-containing fluid can be the hydraulic fracturing composition disclosed herein. By using the method, high conductivity channels are created within the proppant pack. The effects are illustrated in FIG. 15.

Figure 16:
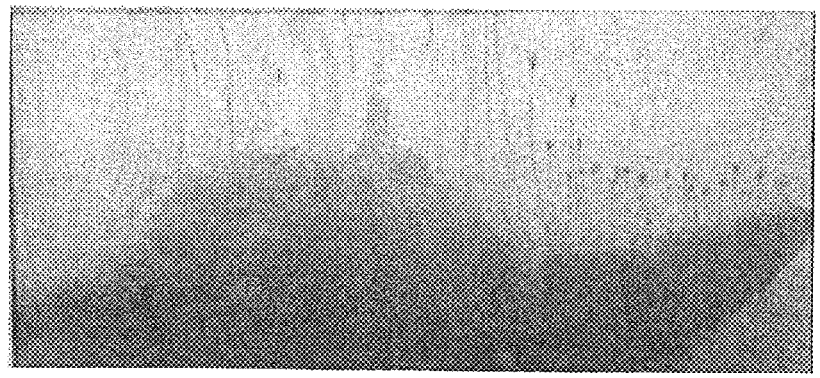
FIG. 16 shows a fracture cell after alternating injection of a proppant-free fluid comprising SPP fluid and a proppant-containing fluid comprising water, a lubricant, and proppant particles.

In another exemplified embodiment, the proppant-free fluid comprises SPP, a fluid to expand the SPP, and optionally a viscose polymer comprising a guar, a guar derivative, a polyacrylamide, glycerol, a polysaccharide, or a combination comprising at least one of the foregoing. For proppant free fluid, 20-60 pounds SPPs are normally prepared in one thousand gallons of proppant-free fluids. Proppant containing fluids comprises an aqueous carrier comprising water, brine, an acid, or a base, proppants, and a lubricant. The lubricant can comprise a polyacrylamide, a guar, a guar derivative, glycerol, a polysaccharide, or a combination thereof. When the lubricant comprises a polyacrylamide, e.g. MaxPerm 20A, MaxPerm 20A is present in an amount of 0.25 to 15 gallons per one thousand gallons of the proppant-free fluid. When the lubricant comprises a guar, the polymer is present in an amount of 1 to 50 pounds per one thousand gallons of the proppant-containing fluid. Heterogeneous proppant distribution can be achieved by this method. The beneficial effects are illustrated in FIG. 16.

In an embodiment, the initial injection of water (or brine) and the viscose polymer is, e.g., 15 minutes each although the length of injection times is different in some embodiments. The injection time for the hydraulic fracturing composition is the same or different as the water or viscose polymer, e.g., having a duration of two hours. It is contemplated that the injection time varies and is selected based on conditions of the formation and the properties of the hydraulic fracturing composition, other fluids (e.g., brine), viscose polymer, and the like.

Figure 5:
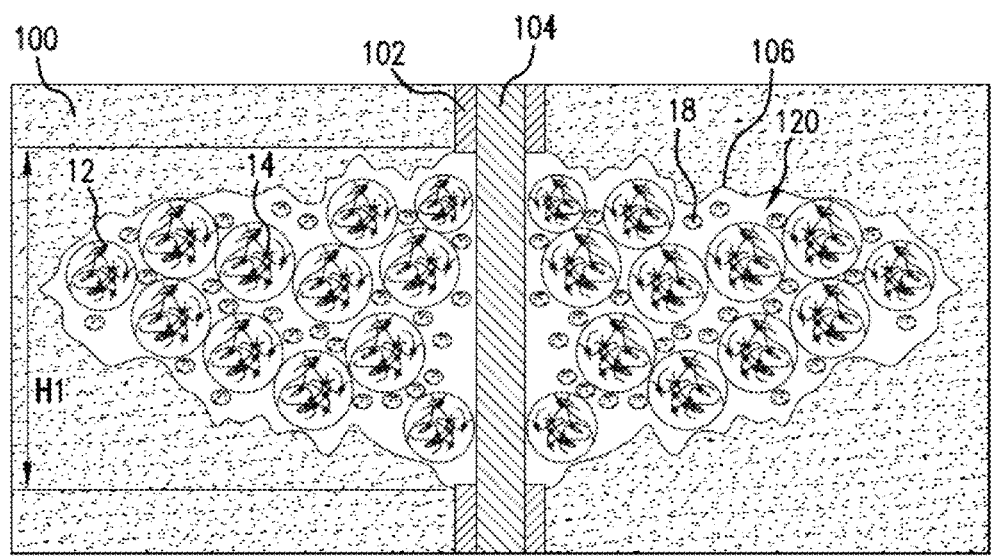
FIG. 5 shows a hydraulic fracturing composition disposed in a fracture before a breaking condition.
Figure 6:
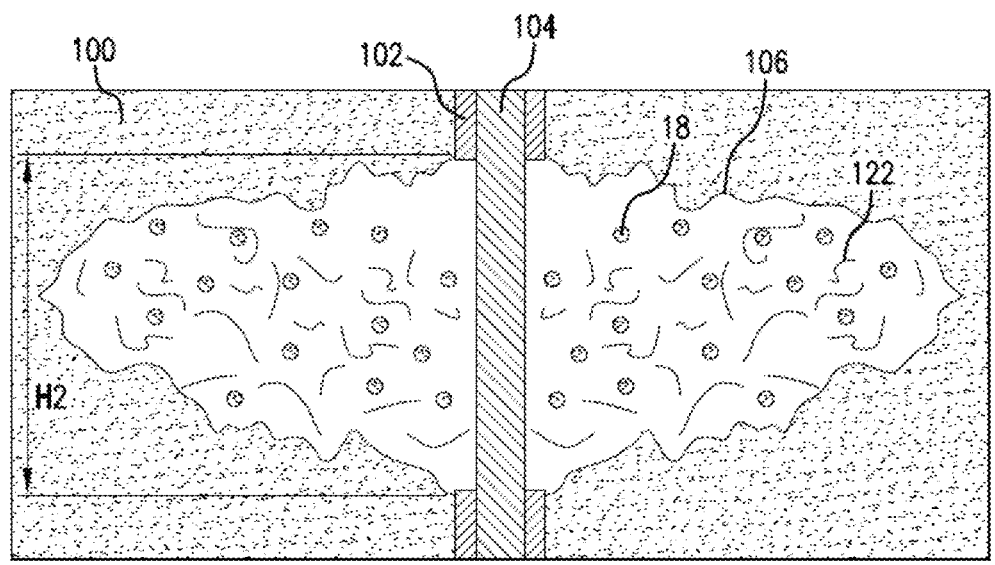
FIG. 6 shows a response of the hydraulic fracturing composition of FIG. 5 to a breaking condition.

A benefit of the hydraulic fracturing composition is that the proppant particles remain disposed in the SAP until the breaking condition causes the SAP to break. As shown in FIG. 5, a formation 100 is traversed by a tubular 104 disposed in casing 102 although only the casing 102 or only the tubular 104 is present in some embodiments. The hydraulic fracturing composition 120 is transferred from an interior of the tubular 104 to contact the formation 100 through an aperture (not shown) in the tubular 104. The hydraulic fracturing composition 120 (which is similar to or identical to that of FIG. 1 or FIG. 2) fractures the formation 100 to create a fracture 106. The proppant particles 18 are disposed in the SAP 12 until the breaking condition occurs at which point the SAP 12 breaks to form a decomposed polymer 122 and releases the proppant particles 18 as shown in FIG. 6. Here, the SAP 12 is not broken nor are the proppant particles 18 released from the SAP 12 before closing of the fracture 106. Therefore, the proppant particles 18 do not settle to the bottom of the fracture 106 before the fracture 106 closes so that the geometry of the fracture 106 is not affected negatively by breaking the SAP 12. That is, before the fracture 106 closes, it has a height H1. After closing, the fracture has a height H2. After closing of the fracture commences, the SAP 12 is broken, and the decomposed polymer 122 is formed. Due to the high degree of suspension of the proppant particles 18 in the SAP 12, the height H2 of the fracture 106 does not vary significantly from the original, pre-closing height H1, such that the height H2 (post-closing) is nearly the same size as the original height H1 (pre-closing).

Figure 7:
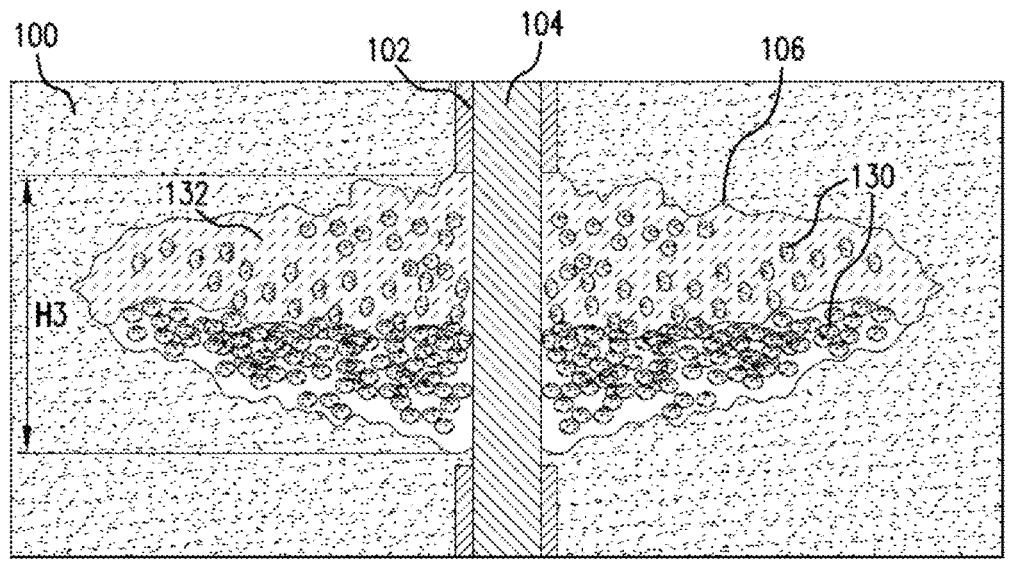
FIG. 7 shows a separated fluid and proppant particles disposed in a fracture before the fracture closes.
Figure 8:
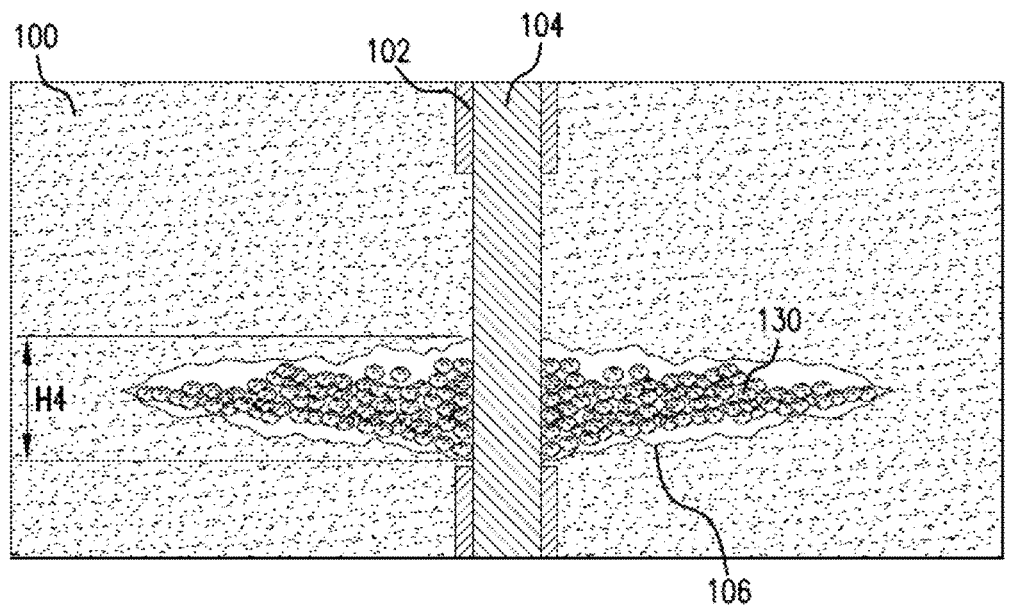
FIG. 8 shows an effect on fracture size for proppant particles that settle before the fracture closes.

During the breaking of SAP 12, the formation pressure squeezes the proppant particles in-situ from settling to the bottom of the fracture by the broken fluids leaking off. In this manner, the hydraulic fracturing composition accomplishes enhanced proppant particles transport and vertical distribution in the fracture. Consequently, the conduction of hydrocarbons or other fluids from the formation 100, through the fracture 106, into the tubular 104 (or a space between the tubular 104 and casing 102) is increased relative to incomplete or imperfect disposal of the proppant particles 18, which is shown in FIGS. 7 and 8. Therefore, the hydraulic fracturing composition 120 transports and disposes the proppant particles 18 to ensure that the proppant particles 18 prop open the fracture 106 in the same or substantially the same geometry as the fracture 106 is initially formed and thus provides more fractured surface area than if the proppant particles settle to the bottom of the fracture as shown in the FIGS. 7 and 8. In this manner, a high conduction pathway for transmission of hydrocarbons and other fluids between the formation and the borehole occurs when using the hydraulic fracturing composition herein.

With regard to FIG. 7 and FIG. 8, when using certain fracturing systems that do not contain the hydraulic fracturing composition herein, such as proppant particles 130 suspended in a fluid 132 without the benefit of the SAP to suspend the proppant particles 130, the proppant particles 130 settle from the fluid 132 and collect on the bottom of the fracture 106 before the fracture 106 closes (FIG. 7). Even though the fracture 106 has an original height H2 before closing (FIG. 7), the height H2 is reduced to a diminished height H4 after closing because the proppant particles 130 settle to the bottom of the fracture 106 before the fracture 106 closed.

The hydraulic fracturing composition and processes herein are illustrated further by the following non-limiting examples.

Example 1

Three sample (A, B, and C) proppant systems were prepared as follows. For sample A, 20 ppt guar was crosslinked in fresh water to make a 20 ppt crosslinked guar. For sample B, 1.92 grams (g) poly(acrylic acid) partial sodium salt graft poly(ethylene oxide) was added to 400 milliliters (mL) tap water to produce an SAP having a particle size distribution from 10 micrometers (μm) to 850 μm microns of 40 ppt SAP. Similarly, for sample C, 2.4 g poly(acrylic acid) partial sodium salt graft poly(ethylene oxide) was added to 400 mL tap water to produce an SAP having a particle size distribution from 10 μm to 850 μm of 50 ppt SAP.

Figure 9:
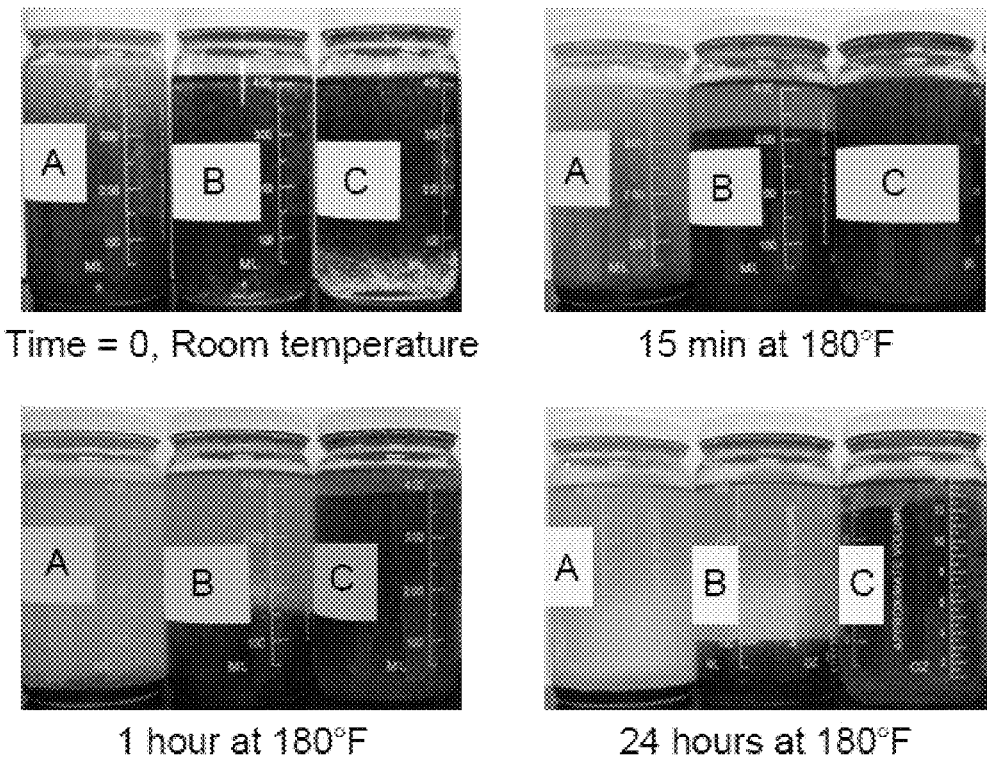
FIG. 9 shows proppant particles disposed in guar or a superabsorbent polymer as a function of time at 180° F.

For each sample (A, B, and C), 0.5 ppa of CarboProp® intermediate-strength proppant particles (intermediate strength proppant particles (ISPPs)) having a median particle diameter of 658 μm was combined with the corresponding 20 ppt crosslinked guar, 40 ppt SAP, or 50 ppt SAP. For samples A, B, and C, no breaker was used. Samples A, B, and C were prepared at room temperature with stirring to suspend the ISPPs in the SAP. FIG. 9 shows samples A, B, and C after preparation at room temperature at various times (15 minutes, 1 hour, and 24 hours) at 180° F. It should be noted that the samples (A, B, and C) were not subjected to agitation after being prepared. Thus, if the ISPPs were released from the pre-hydrated polymer (e.g., the guar or SAP) during testing, the ISPPs collected at the bottom of the container.

At room temperature, samples A, B, and C suspended the ISPPs so that the ISPPs did not settle to the bottom of the container. Upon heating to 180° F., the crosslinked guar system (sample A) did not suspend the ISPPs for 15 minutes. Sample B (40 ppt SAP) partially suspended the ISPPs at one hour but experienced settling of the ISPPs after 24 hours. The ISPPs remained suspended in sample C (containing 50 ppt of the SAP) at 180° F. for greater than 24 hours. As shown in FIG. 9, the SAP concentration is adjusted to suspend the proppant particles for various times.

Example 2

Three sample (D, E, and F) proppant systems were prepared as follows. For sample D, 20 ppt guar was crosslinked in fresh water to make a 20 ppt crosslinked guar. For sample E, 1.92 g poly(acrylic acid) partial sodium salt graft poly(ethylene oxide) was added to 400 mL tap water to provide an SAP having a particle size distribution from 10 μm to 850 μm of 40 ppt SAP. Similarly, for sample F, 2.4 g poly(acrylic acid) partial sodium salt graft poly(ethylene oxide) was added to 400 mL tap water to provide an SAP having a particle size distribution from 10 μm to 850 μm of 50 ppt SAP.

For each sample (D, E, and F), 0.5 ppa of CarboProp® intermediate-strength proppant particles (intermediate strength proppant particles (ISPPs)) having a median particle diameter of 658 μm was combined with the corresponding 20 ppt crosslinked guar, 40 ppt SAP, or 50 ppt SAP. Samples D, E, and F were prepared at room temperature with stirring to suspend the ISPP in the SAP.

Figure 10:
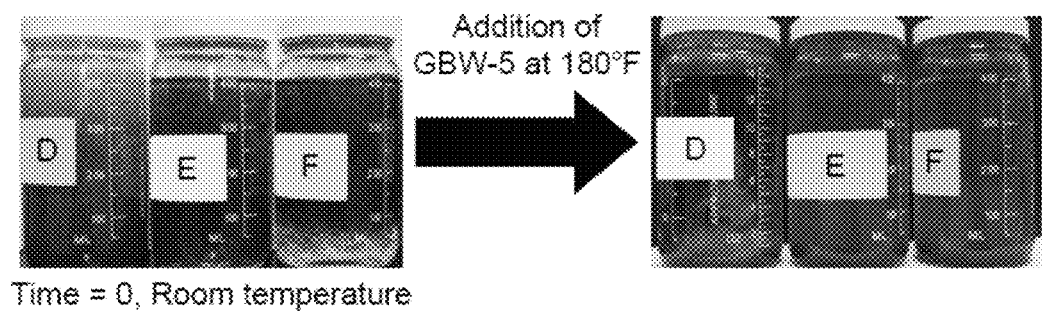
FIG. 10 shows addition of a breaker to guar or a superabsorbent polymer at 180° F.

FIG. 10 shows samples D, E, and F after preparation at room temperature. It should be noted that the samples (D, E, and F) were not subjected to agitation after being prepared. Thus, if the ISPPs were released from the pre-hydrated polymer (e.g., the guar or SAP) during testing, the ISPPs collected at the bottom of the container.

At room temperature, samples D, E, and F suspended the ISPPs so that the ISPPs did not settle to the bottom of the container. An ammonium persulfate breaker was added to samples D, E, and F and upon heating to 180° F. for 5 hours, the crosslinked guar system (sample D) was broken and produced many residues. However, sample E (40 ppt SAP) and sample F (50 ppt SAP) also were broken but with much less residue formation, which demonstrates SAP can be readily broken with addition of conventional gel breaker.

Example 3

A proppant system (sample G) was prepared as follows. For sample G, 16.8 g poly(acrylic acid) partial sodium salt graft poly(ethylene oxide) was added to 4000 mL tap water with 2 gpt MaxPerm 20A. SAP having a particle size distribution from 10 μm to 850 μm to make 35 ppt SAP.

Thereafter, 0.5 ppa of CarboProp® intermediate-strength proppant particles (intermediate strength proppant particles (ISPPs)) having a median particle diameter of 658 μm was combined with the corresponding 35 ppt SAP in sample G.

Sample G was prepared at room temperature with stirring to suspend the ISPPs in the SAP. No breaker was added to sample G during testing.

Figure 11:
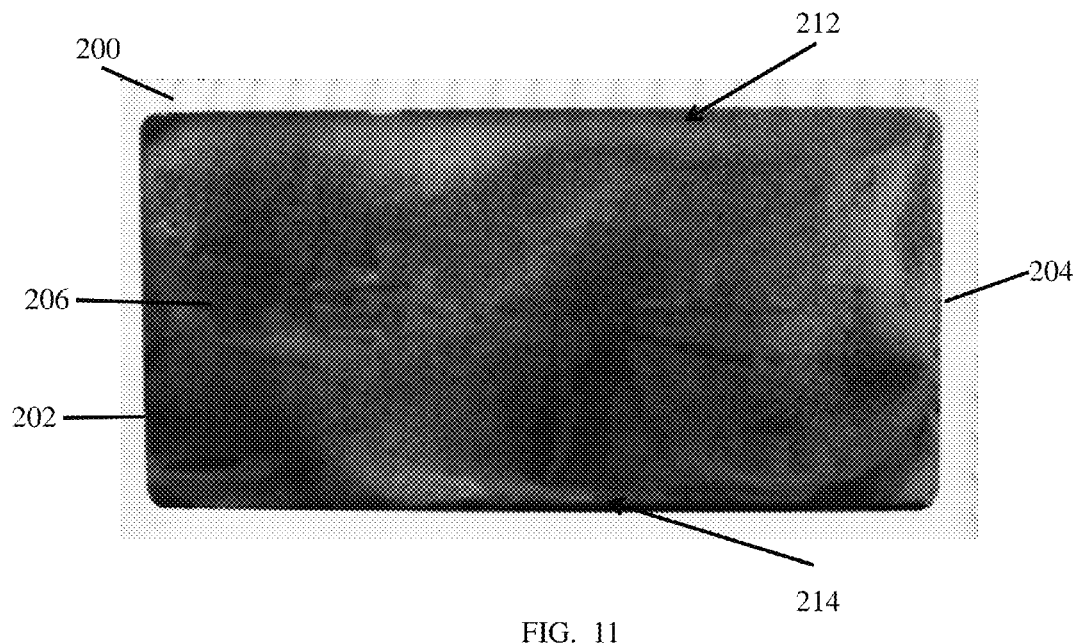
FIG. 11 shows a fracture cell during injection of a hydraulic fracturing composition.

FIG. 11 shows injection of sample G 206 through an injection port 202 into a fracture cell 200 having dimensions of 20 inches (in.)×10 in.×0.625 in. During testing, if any ISPPs were released from the SAP of sample G 206, the ISPPs would have collected at the bottom of the fracture cell 200. The effluent flowed through outlet port 204.

For the duration of injection, sample G 206 exhibited suspension of the ISPPs in the SAP so that the ISPPs did not settle to the bottom of the fracture cell 200. After 30 minutes from beginning injection of sample G 206 into the fracture cell 200, 800 mL of tap water 208 (see FIG. 12) were injected into the fracture cell 200, and the ISPPs remained suspended in the SAP of sample G 206.

Figure 12:
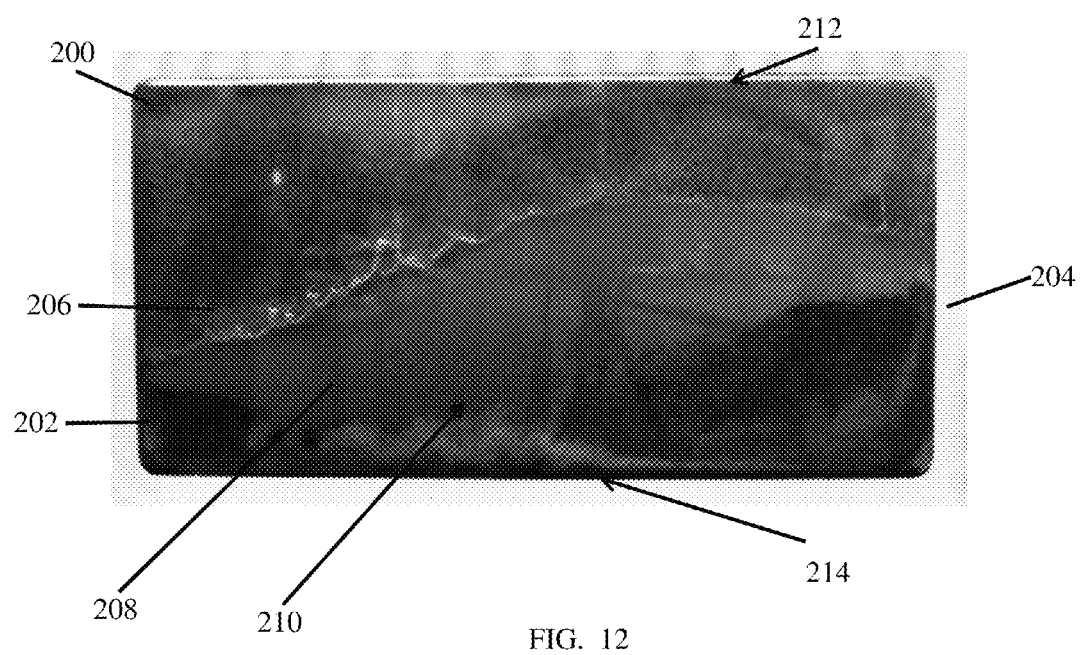
FIG. 12 shows a fracture cell after injection of water into a hydraulic fracturing composition disposed in the fracture cell.

As shown in FIG. 12, the tap water 208 injection created a channel 210 of high permeability through sample G 206, and the channel 210 spanned from the injection port 202 to the outlet port 204. Sample G 206 was partitioned to the top 212 and bottom 214 of the fracture cell 200 by the water channel 210. Nonetheless, the ISPPs remained suspended in the SAP of sample G 206.

Example 4

Three sample fluid systems were prepared as follows. Sample H is the SPP alone fluid, which comprises 40 ppt (pounds per thousand gallon) Aqualic CA QX A-1051 from Nippon Shokubai in Tomball tap water. For sample 1,4 gpt (gallon per thousand gallons) of a polyacrylamide, commercially available from Baker Hughes Incorporated as Max-Perm-20A® was combined with 40 ppt SPP fluid of sample H. For sample J, 3.75 gpt GW-3LDF equal to 15 ppt of a guar, commercially available from Baker Hughes Incorporated as GW-3LDF was combined with 40 gpt of the SPP fluid of sample H.

Figure 13:
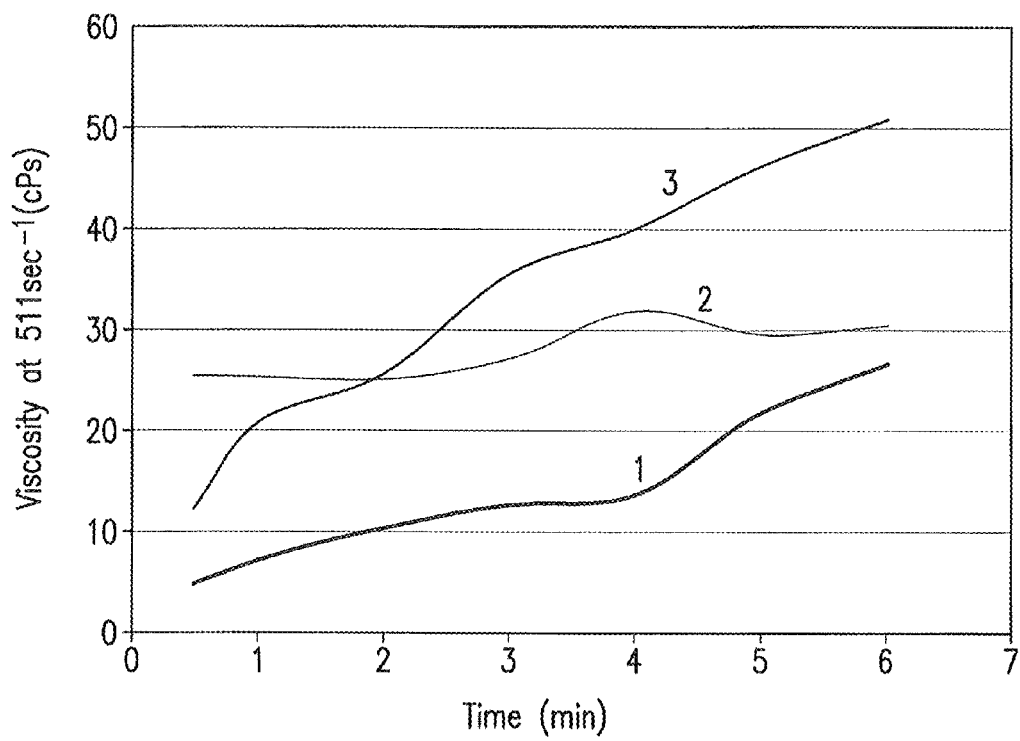
FIG. 13 shows the viscosity difference of a SPP fluid alone and a SPP fluid combined with linear gel systems.

The viscosity of samples H, I, and J was measured at ambient temperature using an Ofite M900 rheometer at 300 revolutions per minute (rpm) according to American Petroleum Institute standard API RP-39. The viscosity results are provided in FIG. 13 where cures 1, 2, and 3 represent the viscosity of samples H, I, and J respectively. As shown in FIG. 13, the addition of linear polymers such as polyacrylamide or guar increases the viscosity of the SPP fluid.

Example 5

Figure 14A:
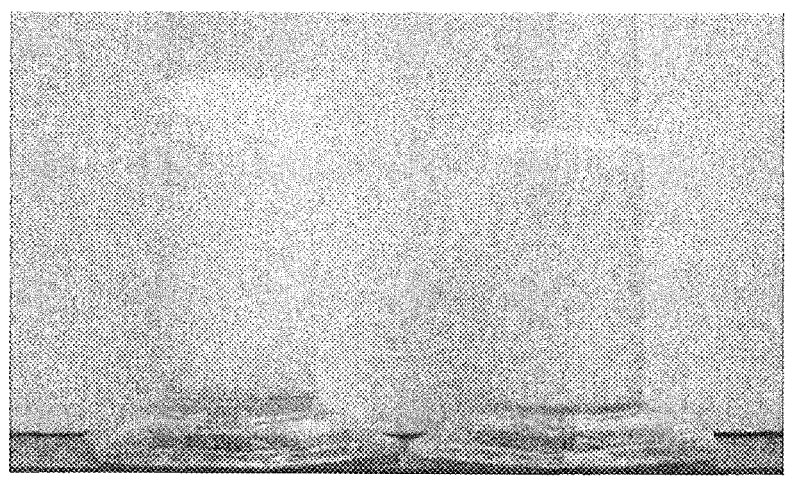
FIG. 14A shows the appearance of sample K and sample L at time zero and FIG. 14B shows the appearance of sample K and sample L after the samples are stored at room temperature for 24 hours.
Figure 14B:
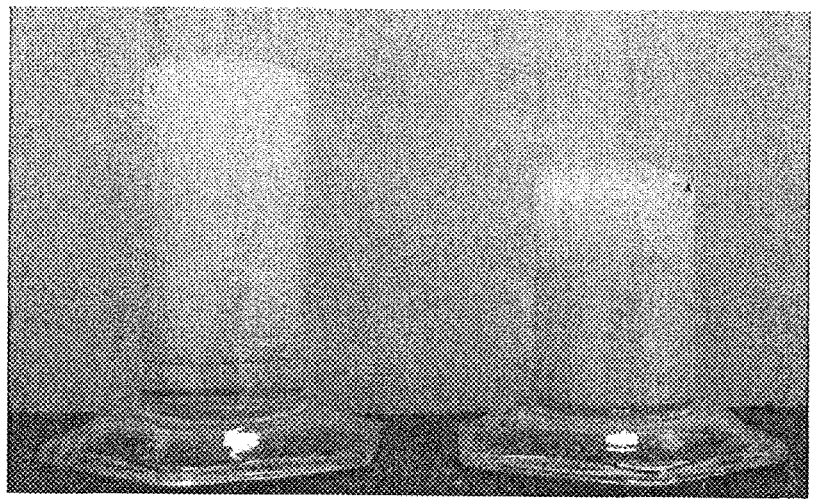

This Example illustrates the effect of SPPs and linear gel on the foam quality and half-life of foam fracturing fluids. Sample K was prepared by adding 40 ppt SPPs (viscosity 68 cPs at 511 sec$^{-1}$) Aqualic CA QX A-1051 from Nippon Shokubai to 2.5 gpt of a fluid commercially available as FAW-22 from Baker Hughes Incorporated. Sample L was prepared by adding 18 gpt GW-3LDF linear guar gel (viscosity 72 cPs at 511 sec$^{-1}$) available from Baker Hughes Incorporated to 2.5 gpt of FAW-22. The initial foam quality, foam quality at 12 hours, and the foam half-life of samples K and L are shown in Table 1. The foam quality of samples K and L are also illustrated in FIGS. 14A and 14B. As shown in Table 1, the initial foam quality generated by sample K is 46% and it slightly decreases to 44% after 24 hours. The half-life of sample K is longer than 24 hours. In contrast, the initial foam quality of sample L is 35% and reduces to 23% at half-time. The half-time of sample L is around 18 hours. The results indicate that SPP is more efficient in improving the foam quality and half-life of a foam fracturing fluid as compared to a guar linear gel.

TABLE 1

| Sample | Initial Foam Quality | Foam Quality at 12 hrs | Foam half-life |
| --- | --- | --- | --- |
| K | 46% | 44% | >24 hrs |
| L | 35% | 23% | 18 hrs |

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements.

All references are incorporated herein by reference.

The use of the terms "a" and "an" and "the" and similar referents in the context of describing the invention (especially in the context of the following Claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for disposing a plurality of proppant particles in a fracture, the process comprising:
   disposing a hydraulic fracturing composition in a downhole environment, the hydraulic fracturing composition comprising:
   a superabsorbent polymer in an expanded state and configured to break in response to a breaking condition, such that a decomposed polymer is formed from the superabsorbent polymer, the superabsorbent polymer comprising particles having internal crosslinks derived from ethyleneglycol diacrylate, polyethyleneglycol diacrylate, trimethylopropane trimethacrylate, ethoxylated trimethylol triacrylate, ethoxylated pentaerythritol tetracrylate, or a combination comprising at least one of the foregoing but no intra-particle crosslinks, the superabsorbent polymer comprising a repeat unit derived from an acrylic acid, an acrylate, an acrylamide, a vinylpyrrolidone, a vinyl acetate, a 2-acrylamide-2-methylpropanesulfonic acid, a derivative thereof, or a combination thereof, the superabsorbent polymer being present in a mass concentration of 5 ppt to 200 ppt, based on the total volume of the hydraulic fracturing composition, and the superabsorbent polymer in the expanded state having a viscosity of about 1 centipoise to 300 centipoise as measured by Ofite M900 rheometer at a temperature of 180° F.;

a plurality of proppant particles disposed in a space between adjacent superabsorbent polymer particles prior to release of the plurality of proppant particles from the space between adjacent superabsorbent polymer particles in response to breaking the superabsorbent polymer;

an additive comprising a surfactant, a viscous polymer, or a combination thereof; and a fluid to expand the superabsorbent polymer into the expanded state;

forming a fracture in the downhole environment; disposing the hydraulic fracturing composition in the fracture:

breaking the superabsorbent polymer with a breaker after forming the fracture; and releasing the plurality of proppant particles from the superabsorbent polymer to dispose the plurality of proppant particles in the fracture.

2. The process of claim 1, wherein breaking the superabsorbent polymer is carried out after closing of the fracture commences.

3. The process of claim 1, wherein the breaker comprises a persulfate.

4. The process of claim 1, wherein the breaker is present in a mass concentration from greater than 0 ppt to 20 ppt, based on the total volume of the hydraulic fracturing composition.

5. The process of claim 1, wherein the superabsorbent polymer particles have a size of 10 microns to 1,000 microns.

6. A process for disposing a plurality of proppant particles in a fracture, the process comprising:

injecting a proppant-free fluid and a proppant-containing fluid in an alternating order into a subterranean formation;

wherein the proppant-free fluid comprises an aqueous carrier comprising water, brine, an acid, or a base; and a lubricant comprising 0.25 to 15 gallons of the polyacrylamide per one thousand gallons of the proppant-free fluid or 1 to 50 pounds of a guar or guar derivative per one thousand gallons of the proppant-free fluid; and the proppant-containing fluid comprising a superabsorbent polymer in an expanded state and configured to break in response to a breaking condition caused by a breaker, the superabsorbent polymer comprising particles having internal crosslinks derived from ethyleneglycol diacrylate, polyethyleneglycol diacrylate, trimethylopropane trimethacrylate, ethoxylated trimethylol triacrylate, ethoxylated pentaerythritol tetracrylate, or a combination comprising at least one of the foregoing, the superabsorbent polymer comprising a repeat unit derived from an acrylate, an acrylamide, a vinylpyrrolidone, a vinyl acetate, a 2-acrylamide-2-methylpropanesulfonic acid, a derivative thereof, or a combination thereof, the superabsorbent polymer being present in an amount of 5 ppt to 200 ppt based on the total volume of the proppant-containing fluid, and the superabsorbent polymer in the expanded state having a viscosity of about 1 centipoise to 300 centipoise as measured by Ofite M900 rheometer at a temperature of 180° F.;

a plurality of proppant particles disposed in the space between adjacent superabsorbent polymer particles prior to release of the plurality of proppant particles from the space between adjacent superabsorbent polymer particles in response to breaking the superabsorbent polymer; and a fluid to expand the superabsorbent polymer into the expanded state.

7. The process of claim 6, wherein the proppant-containing fluid further comprises a polyacrylamide, a guar, a guar derivative, glycerol, a polysaccharide, or a composition comprising at least one of the foregoing.

8. The process of claim 6, wherein the superabsorbent polymer is derived from an acrylic acid and its salts.

9. The process of claim 8, wherein the superabsorbent polymer comprises the internal crosslink derived from polyethylene glycol diacrylate.

10. A process for disposing a plurality of proppant particles in a fracture, the process comprising:

injecting a proppant-free fluid and a proppant-containing fluid in an alternating order into a subterranean formation;

wherein the proppant-free fluid comprises about 20 to about 60 pounds of a superabsorbent polymer per one thousand gallons of the proppant-free fluid in an expanded state and configured to break in response to a breaking condition caused by a breaker, the superabsorbent polymer comprising particles having internal crosslinks derived from ethyleneglycol diacrylate, polyethyleneglycol diacrylate, trimethylopropane trimethacrylate, ethoxylated trimethylol triacrylate, ethoxylated pentaerythritol tetracrylate, or a combination comprising at least one of the foregoing but no intraparticle crosslinks, the superabsorbent polymer comprising a repeat unit derive from an acrylate, an acrylamide, a vinylpyrrolidone, a vinyl acetate, a 2-acrylamide-2-methylpropanesulfonic acid, a derivative thereof, or a combination thereof, and the superabsorbent polymer in the expanded state having a viscosity of about 1 centipoise to 300 centipoise as measured by Ofite M900 rheometer at a temperature of 180° F.; and a fluid to expand the superabsorbent polymer into the expanded state; and wherein the proppant-containing fluid comprises an aqueous carrier comprising water, brine, an acid, or a base: a plurality of proppant particles, and a lubricant.

11. The process of claim 10, wherein the proppant-free fluid further comprises a polyacrylamide, a guar, a guar derivative, glycerol, a polysaccharide, or a combination comprising at least one of the foregoing.

12. The process of claim 10, wherein the lubricant in the proppant-containing fluid comprises a polyacrylamide, a guar, a guar derivative, glycerol, a polysaccharide, or a combination comprising at least one of the foregoing.

13. The process of claim 10, wherein the superabsorbent polymer is derived from an acrylic acid and its salts.

14. The process of claim 13, wherein the superabsorbent polymer comprises the internal crosslink derived from polyethylene glycol diacrylate.

* * * * *